(12) United States Patent
Golub et al.

(10) Patent No.: US 9,823,126 B2
(45) Date of Patent: Nov. 21, 2017

(54) APPARATUS AND METHOD FOR SNAPSHOT SPECTRAL IMAGING

(71) Applicant: Ramot at Tel-Aviv University Ltd., Tel-Aviv (IL)

(72) Inventors: Michael Golub, Rehovot (IL); Amir Averbuch, Tel Aviv (IL); Menachem Nathan, Tel Aviv (IL); Roman Malinsky, Holon (IL); Valery Zheludev, Tel Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 14/967,398

(22) PCT Filed: Jun. 16, 2014

(86) PCT No.: PCT/IB2014/062270
§ 371 (c)(1),
(2) Date: Dec. 14, 2015

(87) PCT Pub. No.: WO2014/203151
PCT Pub. Date: Dec. 24, 2014

(65) Prior Publication Data
US 2016/0313181 A1    Oct. 27, 2016

Related U.S. Application Data

(60) Provisional application No. 61/836,218, filed on Jun. 18, 2013.

(51) Int. Cl.
*G01J 3/28* (2006.01)
*G01J 3/02* (2006.01)
*G01J 3/36* (2006.01)

(52) U.S. Cl.
CPC .............. *G01J 3/027* (2013.01); *G01J 3/0205* (2013.01); *G01J 3/2823* (2013.01); *G01J 3/36* (2013.01); *G01J 2003/2826* (2013.01)

(58) Field of Classification Search
CPC .... G01J 3/02; G01J 3/28; G01J 3/2803; G01J 3/10; G01J 3/2823
(Continued)

(56) References Cited

U.S. PATENT DOCUMENTS 6,154,493 A     11/2000  Acharya et al.
8,886,283 B1 *  11/2014  Chen ................. A61B 5/055
                                                      382/128

(Continued)

FOREIGN PATENT DOCUMENTS

WO      2008012812 A2     1/2008

OTHER PUBLICATIONS

International Search Report and Written Opinion issued in related PCT patent application PCT/IB2014/062270 dated Aug. 21, 2014, 8 pages.

(Continued)

*Primary Examiner* — Tarifur Chowdhury
*Assistant Examiner* — Md M Rahman
(74) *Attorney, Agent, or Firm* — Nathan & Associates Patent Agents Ltd.; Menachem Nathan

(57) ABSTRACT

Apparatus and method for obtaining a plurality of spectral images of a source object in a snapshot using comprising two-dimensional compressed sensing data cube reconstruction (2D CS-SCR) applied to a dispersed-diffused snapshot image. In some embodiments, the snapshot image is obtained through a RIP diffuser. In some embodiments, a randomizer is used to further randomized the dispersed-diffused snapshot image. The 2D CS-SCR includes applying a 2D framelet transform separately to arrays representing
(Continued)

different wavebands of spectral cube data derived from the snapshot image. The application of the 2D framelet transform separately to the arrays representing the different wavebands includes application of direct and inverse 2D framelet transforms to the arrays. In some embodiments, the direct and inverse framelet transforms are included in a split Bregman iteration.

22 Claims, 16 Drawing Sheets

(58) Field of Classification Search
USPC .......................................................... 356/326
See application file for complete search history.

(56) References Cited

U.S. PATENT DOCUMENTS

| | | |
|---|---|---|
| 2007/0285554 A1 | 12/2007 | Givon |
| 2010/0013979 A1* | 1/2010 | Golub .................. G01J 3/2803 348/340 |
| 2013/0194481 A1 | 8/2013 | Golub et al. |
| 2014/0009670 A1* | 1/2014 | Znamenskiy ...... H04N 5/23267 348/362 |

OTHER PUBLICATIONS

Z. Cai et al., "Split Bregman Methods and Frame Based Image Restoration" Siam J. of Multiscale Modeling and Simulation, vol. 8(2), pp. 337-369, 2009.

A. Averbuch and V. Zheludev "Interpolatory frames in signal space", IEEE Trans. Sign. Proc., 54(6), pp. 2126-2139, 2006.

A. Averbuch, P. Neittaanmaki and V. Zheludev, "Splines and spline wavelet methods with application to signal and image processing. vol. I: Periodic splines", Springer, 2014.

E. J. Candes and T. Tao, "Decoding by Linear Programming," IEEE Trans. Information Theory 51(12): pp. 4203-4215 2005.

A. Averbuch and V. Zheludev, "Construction of bi-orthogonal discrete wavelet transforms using interpolatory splines", Applied and Computational Harmonic Analysis, 12, pp. 25-56, 2002.

A. Averbuch, A. B. Pevnyi, and V. A. Zheludev, "Bi-orthogonal Butterworth wavelets derived from discrete interpolatory splines", IEEE Trans. Signal Processing, 49(11), pp. 2682-2692, 2001.

Golub et al, "Spectral multiplexing method for digital snapshot spectral imaging", Applied Optics, Optical Society of America, Mar. 10, 2009, pp. 1520-1526, vol. 48, No. 8. Washington DC, US.

M E Gehm et al, "Single-shot compressive spectral imaging with a dual-disperser architecture References and links", IEEE Trans. Geosci. Remote Sens. Science J. Opt. Soc. Am. A Appl. Opt. Appl. Opt. Appl. Spectrosc. Appl. Opt. Opt. Express IEEE Trans. Inf. Theory IEEE Trans. Inf. Theory.. Compressed Sensing IEEE Trans. Inf. Theory M. Harwit and N. Sloane, Hadamard T, Jan. 1, 2003, pp. 1347-1354, vol. 41, No. 29.

Hagen Nathan et al, "Review of snapshot spectral imaging technologies", Optical Engineering, Soc. of Photo-Optical Instrumentation Engineers, Bellingham, Sep. 1, 2013, pp. 90901, vol. 52, No. 9.

Extended European Search Report issued in related EP patent application No. 14814111.2 dated Jan. 30, 2017. 8 pages.

\* cited by examiner

200'

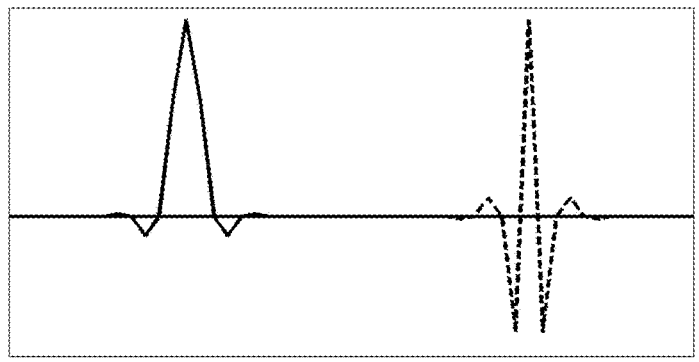
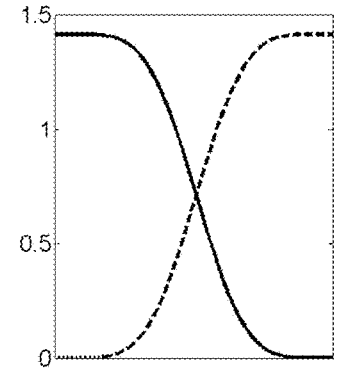
FIG. 5A　　　　　　　　　　　FIG. 5B
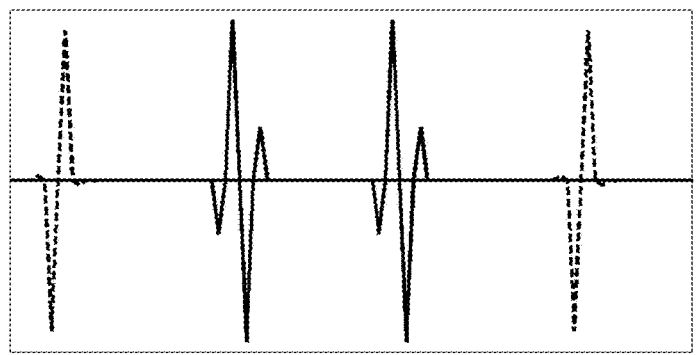
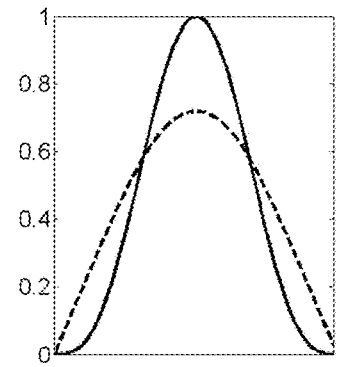
FIG. 5C　　　　　　　　　　　FIG. 5D
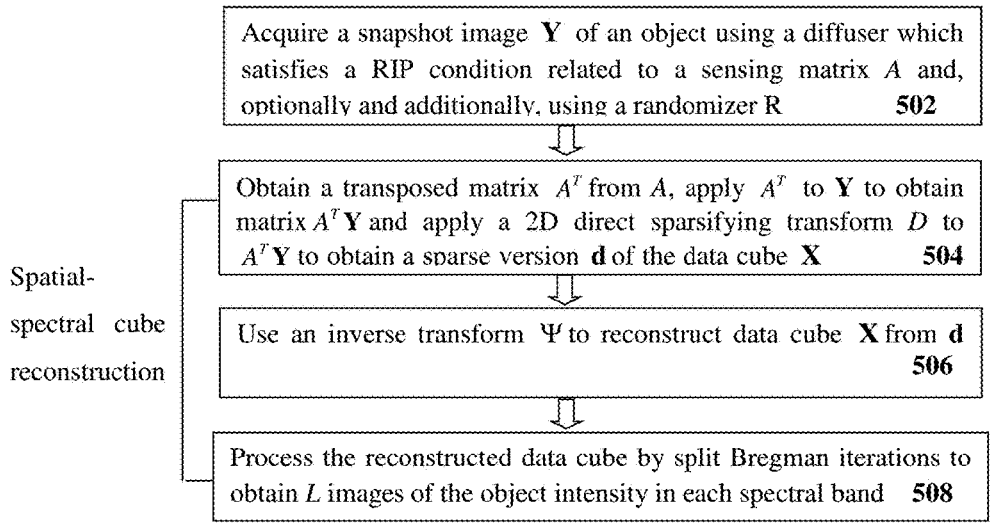
FIG. 6A

APPARATUS AND METHOD FOR SNAPSHOT SPECTRAL IMAGING

CROSS REFERENCE TO EXISTING APPLICATIONS

This application is a 371 of international patent application PCT/IB2014/062270 and is related to and claims priority from U.S. Provisional Patent Application No. 61/836,218 having the same title and filed Jun. 18, 2013, which is incorporated herein by reference in its entirety.

FIELD

Embodiments disclosed herein relate in general to spectral imaging (SI) apparatus, systems and methods and in particular to snapshot ("single shot") hyperspectral imaging (HSI) using digital cameras and compressed sensing (CS)-based spatial-spectral cube reconstruction (SCR) algorithms.

BACKGROUND

"Spectral imaging" is commonly understood as referring to imaging with a limited number of wavelengths (e.g. up to 10) in a given wavelength range, e.g. the visible ("VIS") range or the near-infrared ("NIR") range. "Hyperspectral imaging" is commonly understood as referring to imaging with a larger number of wavelengths in a given wavelength range, for example between 10 and hundreds or even thousands of wavelengths. "Snapshot" SI and HSI imagers perform simultaneous (instantaneous) acquisition of spatial and spectral data in a single snapshot. The data acquired forms a "spatial-spectral cube" (also referred to herein simply as "spectral cube" or "data cube") of a source object (also referred to simply as "object" or "scene"). "Spatial-spectral cube", "spectral cube" and "data cube" are hereinafter used interchangeably. A data cube includes light intensity data in two spatial dimensions and one spectral dimension and is expressed as a three-dimensional (3D) matrix.

Commonly authored and assigned U.S. patent application Ser. No. 13/752,560 titled "Snapshot spectral imaging based on digital cameras" (published as US Pat. Pub. 20130194481), which is incorporated herein by reference in its entirety, teaches compressed sensing (CS)-based snapshot spectral imaging (CS-SSI) in apparatus including an imaging lens, a dispersed image sensor and a restricted isometry property (RIP) diffuser inserted in the optical path between a source image and a pixelated (as. e.g. in a digital camera) image sensor. The RIP diffuser may be one dimensional (1D). It provides a dispersed and diffused image ("DD image") at the dispersed image sensor. Due to the 1D RIP diffuser optical properties, each pixel in the DD image includes a linear mixture of spectral and spatial information from all pixels of a corresponding column in the DD image. In US 20130194481, full reconstruction of the data cube is performed using a CS-based optimization process to compensate for the underdetermined nature of the problem. The operator performing the linear projections can be described as a "sensing matrix" that has fewer rows than columns and that operates on the data cube to form a DD image. The reconstruction process guarantees full reconstruction of the source object if the sensing matrix satisfies a RIP condition. The RIP diffuser is designed such that the transfer-function (which is identical with the sensing matrix) of an optical imaging system including the diffuser satisfies the RIP condition at each single wavelength (or at a band chosen around a single wavelength).

The solution provided in US 20130194481 performs 1D CS-SCR using block Toeplitz matrices to perform a single 1D transform applied sequentially to columns of an array that comprises all the wavebands images concatenated in a vertical direction. It has been shown that the RIP condition for block Toeplitz matrices is harder to uphold than for random ones, in terms of the sparsity required from the signal one wishes to reconstruct.

SUMMARY

In various embodiments there are disclosed methods and apparatus for HSI based on CS principles. In the following description "snapshot spectral imager", "SSI apparatus" and "SSI camera" are used interchangeably. The reference throughout is to "HSI", although apparatus and methods disclosed herein can also be used for spectral imaging with a smaller number of wavelengths. Consequently, "spectral imaging" may be used in the following description as a general term for imaging using from three wavelengths (i.e. R(ed), G(reen) and B(lue)) up to hundreds and even thousands of wavelengths.

An apparatus disclosed herein is a snapshot hyperspectral imager. Thus, "apparatus for HSI" "HSI apparatus" and "snapshot hyperspectral imager" may be used interchangeably. Although focused on spectral imaging of a source object, methods and apparatus disclosed herein can also be applied to gray or colored images with various spectra at different spatial positions on the object.

We discovered that the SCR described in commonly owned US 20130194481 can be further improved by application of a two-dimensional (2D) framelet transform separately to the arrays representing different wavebands, instead of the sequential column-wise application of a 1D transform used therein. The application of the 2D framelet transform separately to arrays representing different wavebands of spectral cube data, referred to hereinafter as "2D CS-SCR", includes application of direct and inverse 2D framelet transforms to the arrays. The direct and inverse framelet transforms are included exemplarily in a split Bregman iteration. The framelet transform inside the Bregman iteration uses a split-to-wavelength bands instead of the split-to-one spatial coordinate end. The 2D CS-SCR disclosed herein provides faster and better (in terms of peak signal-to-noise ratio or "PSNR") SCR than the 1D CS-SCR described in US 20130194481

We also discovered that for certain objects, the addition of a randomization operation during image acquisition, performed with either an added hardware (HW) optical element ("HW randomizer") or algorithmically in software ("SW randomizer"), may further improve the 2D CS-SCR results. In some apparatus and method embodiments disclosed hereinbelow, a randomizer is added to a SSI apparatus described in US 20130194481. The randomizer aids in the reconstruction of spectral images of a non-sparse ("regular") object. A HW randomizer may be implemented as a thin optical element at the image sensor plane. The randomizer causes the DD image data reaching the image sensor (for the HW randomizer) or the DD image data obtained with the image sensor (for the SW randomizer) to become completely random and to result in a "randomized image". As used herein, "randomized image" refers to the image data obtained after the action of the randomizer on the DD image.

In some embodiments, a single random matrix R of the randomizer is taken from a statistical ensemble.

In some embodiments there are provided snapshot spectral imaging apparatus and methods based on digital cameras with minimal hardware changes. The SSI process includes performing 2D CS-SCR from a DD image of a source object, with or without added randomization.

In an embodiment, there is provided apparatus for obtaining a plurality of spectral images of a source object in a snapshot, the apparatus comprising an imaging section of a digital camera that includes a lens and a pixelated image sensor, the imaging section configured to obtain a DD snapshot image Y, and a digital processor configured to perform 2D CS-SCR from snapshot image Y, thereby providing images of the source object in a plurality of spectral bands.

In an embodiment, there is provided a method for obtaining a plurality of spectral images of a source object in a snapshot comprising the steps of obtaining a DD snapshot image Y and performing 2D CS-SCR from snapshot image Y, thereby providing images of the source object in a plurality of spectral bands. In some embodiments, snapshot image Y is obtained by imaging the source object with an imaging section of a digital camera that includes a lens and a pixelated image sensor positioned at an image sensor plane, wherein the DD image is formed through a RIP diffuser that satisfies a RIP condition related to a sensing matrix A. In such embodiments, the 2D CS-SCR includes transposing sensing matrix A into a transposed matrix $A^T$, applying $A^T$ to Y to obtain $A^T Y$, applying a 2D direct sparsifying transform D to $A^T Y$ to obtain a sparse version d of a reconstructed data cube X, using an inverse transform $\Psi$ to obtain X from d, and processing X by to obtain the images of the source object in the plurality of spectral bands.

In some embodiments, spectral images are reconstructed from a randomized image using spline-based frames. In some embodiments, spline-based frames are applied to reconstruct spectral images from superposition of several randomized monochromatic images.

BRIEF DESCRIPTION OF THE DRAWINGS

Aspects, embodiments and features disclosed herein will become apparent from the following detailed description when considered in conjunction with the accompanying drawings. Like elements may be numbered with like numerals in different figures, wherein:

FIG. 5A-D shows graphs of the impulse and magnitude responses of the of a four-channel PR filter bank, which implements the framelet transforms inside the Bregman iterations for an exemplary embodiment of APZFrame;

FIG. 6A shows schematically in a flow chart an embodiment of a method for SSI disclosed herein;

DETAILED DESCRIPTION

SSI Apparatus without Randomizer

Figure 1A:
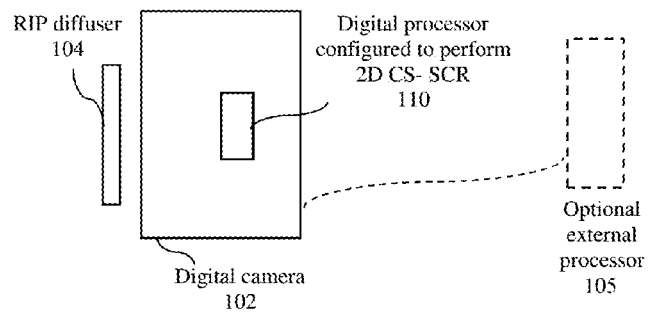
FIG. 1A shows schematically an embodiment of a snapshot spectral imaging (SSI) apparatus disclosed herein, based on digital camera with RIP diffuser and without randomizer.
Figure 1B:
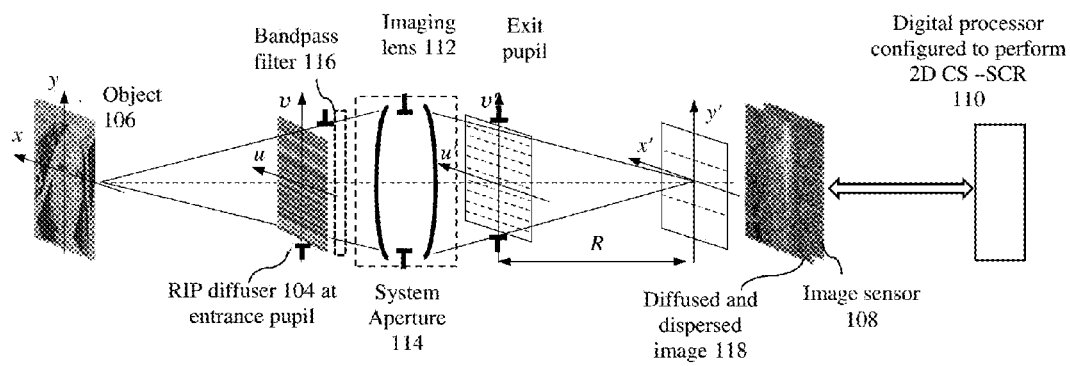
FIG. 1B shows more details of the apparatus embodiment of FIG. 1A.

FIGS. 1A and 1B show schematically an embodiment 100 of a snapshot spectral imaging (SSI) apparatus based on digital camera with RIP diffuser. Apparatus 100 may be viewed as a digital camera 102 optically coupled to a RIP diffuser 104 positioned between the camera and a source object (106 in FIG. 1B) imaged with the camera. Camera 102 may include components of a regular digital camera such as a lens (not shown), an image sensor 108 and a digital processor 110. The digital camera may be any known camera, for example a SLR camera, a video camera, a cell-phone camera or a miniaturized camera of the type used in gastroscopy or endoscopy. As used herein, "digital camera" may include only the basic elements and functions of an imaging section needed to obtain an image of a source object on a pixelated image sensor. Thus, a lens/sensor combination coupled to an image processor, as present for example in a smart-phone camera, are to be considered an imaging section for purposes set forth herein.

Apparatus 100 is in principle similar to apparatus disclosed in US 20130194481 (e.g. apparatus 200 therein) except that processor 110 is configured to perform 2D CS-SCR instead of the 1D CS-SCR disclosed in US 20130194481. A detailed and enabling example of the 2D CS-SCR process is provided below. Optionally, apparatus 100 may include an added external (to the camera) digital processor 105 configured to perform some or all of the 2D CS-SCR disclosed herein.

FIG. 1B provides a more detailed view of apparatus 100. In addition to the components above, camera 100 includes an imaging lens 112 with an aperture 114 and, optionally, a band-pass filter 116. The RIP diffuser 104 may be positioned at or near an entrance pupil of the imaging lens 112. As described in detail in US 20130194481, the imaging of object 106 through RIP diffuser 104 and lens 112 provides a snapshot DD image 118 at image sensor 108. The image data associated with image 118 is processed by processor 110, which may be configured to also fulfill other functions such as controlling various camera functions and operations.

Mathematical Model of the Optical System

The following model is described with reference to a single lens SSI apparatus as in FIGS. 1 and 2. The basic principles of such apparatus apply also to multi-lens cameras if the whole optical system of a camera is considered to be a single lens with an effective focal length derived from a combination of all the lenses. The model has a number of stages:

Representation of a Diffused Image as a Convolution Between an Original Image and a Point Spread Function (PSF)

Suppose that an ideal original image of a source object obtained (without use of diffuser or randomizer) has an intensity distribution $I_0(x, y; \lambda)$, which is a cross section of a data cube at wavelength $\lambda$. The RIP diffuser has a complex transmission function P:

$$P(\upsilon';\lambda) = \exp[i\phi(\upsilon';\lambda)] \quad (1)$$

where $\phi(\upsilon'; \lambda)$ is a phase function of the diffuser at wavelength $\lambda$. When installed into the optical system, the RIP diffuser converts the original image to a DD image, since the imaging system ceases to be ideal. The shape and characteristics of the DD image can be calculated as function of P and of the original image. The coherent point-spread function of the system can be calculated as Fourier transform of P:

$$h(y'; \lambda) = \frac{1}{i\lambda R} \int P(v'; \lambda) \exp\left(i2\pi \frac{v'y'}{\lambda R}\right) dv' \quad (2)$$

and describes the system's impulse response for the delta function at input, in complex amplitude of the electromagnetic field, where R is a distance from the exit pupil to the image sensor of the imaging system. If the light is incoherent, one can measure only the intensity of light received by the image sensor. Accordingly, the system's impulse response in intensity is described by the incoherent PSF $h_I(y'; \lambda)$ given by:

$$h_I(y';\lambda) = |h(y';\lambda)|^2 \lambda^2 \quad (3)$$

A spatially shift invariant model imaging system provides the DD image intensity as a 1D convolution $I' = h_I(x) \cdot I$ of the ideal ("non-dispersed") image I with the incoherent PSF $h_I$:

$$I'(x,y';\lambda) = \int h_I(y'-y;\lambda) I(x,y;\lambda) dy \quad (4)$$

where $I(x, y; \lambda_l)$ is the intensity of an ideal image of a spatially incoherent source object obtained by the imaging system without use of diffuser or randomizer at wavelength $\lambda_l$, and x, y are Cartesian coordinates at the image sensor. Note that a 1D convolution is calculated separately for each coordinate x of the ideal image.

Representing the DD or Randomized Image, the Data Cube and the PSF as Matrices

Since the DD image is taken with a pixelated image sensor, it is in effect sampled and can be represented as a matrix of the intensity in each pixel. The incoherent PSF can also be represented by a Toeplitz matrix that represents convolution Eq. (4). The image sensor has naturally a discrete pixelated structure characterized by a 2D spatial pitch $\delta_x \times \delta_y$, a number $N_x, N_y$ of pixels and a number $N_b$ of bits per pixel. In an embodiment, an imaging zoom is chosen such that an image blur caused by the RIP diffuser causes the dispersed-diffused image to occupy all $N_y$ pixels in each column and all $N_x$ pixels in each row at the image sensor. Accordingly, an "undiffused-undispersed image" obtained without the RIP diffuser at the same zoom occupies only a smaller number $N < N_y$ of pixels located in a central part of each column and all $N_x$ pixels in each row at the image sensor. The data cube is defined as a 3D array with size $N_x \times N \times L$, where $N_x, N$ are spatial dimensions and L is a spectral dimension, i.e. the number of spectral bands or wavelengths in the spectral image. Even though the number $N_x \times N_y$ of sensed pixels (i.e. dimensions of experimental data) may be substantially smaller than number of voxels in a targeted 3D data cube with dimensions $N_x \times N \times L$, we suggest a solution for the 3D data cube by resorting to a CS approach and making use of implicit redundancy in the image data. The suggested solution provides the data compression rate $N \times L / N_y$.

Following discrete notations customary in CS, we define the following index ranges: a range $i = \overline{1,N}$ and $i' = \overline{1,N_y}$ runs in the y direction of the data cube and sensor pixels, a range $j = \overline{1,N_x}$ runs in the x direction of the data cube and sensor pixels, and a range $l = \overline{1,L}$ runs in the $\lambda$ direction of the data cube. The centers of the sensor's pixels have Cartesian coordinates:

$$x_j = \left(j - \frac{N_x + 1}{2}\right)\delta_x, \quad y_{i'} = -\left(i' - \frac{N_y + 1}{2}\right)\delta_y, \quad (5)$$

The voxels of data cube share spatial pitches of the sensor but have a different index range, so their indices are shifted by:

$$i_c = \frac{N_y - N}{2} > 0.$$

and their Cartesian coordinates are $x_j$ and $y_{i+i_c}$. Cartesian coordinates at the plane of the RIP diffuser are denoted as u', $\upsilon'$. The RIP diffuser with linear dimensions $D_{u'} \times D_{\upsilon'}$ of the clear aperture (see FIGS. 3B and 3C) comprises $$N_d = D_{\upsilon'}/\Delta \upsilon' \quad (6)$$

vertical straight line strips extending parallel to the u' axis, with widths $\Delta \upsilon'$ and centers $$v'_k = \left(k - \frac{N_d + 1}{2}\right)\Delta v', \quad k = \overline{1, N_d} \quad (7)$$

Therefore the RIP diffuser can be described by a complex piece-wise constant pupil function that depends only on the coordinate $\upsilon'$:

$$P(v';\lambda_l) = \sum_{k=0}^{N_d} P_{kl} \, rect\left(\frac{v' - v'_k}{\Delta v'}\right) l = \overline{1, L} \quad (8)$$

-continued $$P_{k,l} = \exp(i\varphi_{k,l}), \quad (9)$$

where $\phi_{k,l}$ is a phase constant within a width $\Delta v'$ of the $k^{th}$ strip on the RIP diffuser, $k=\overline{1,N_d}$ $\lambda_l$ is a central wavelength of a spectral band number $l=\overline{1,L}$, and L is the total number of spectral bands.

Equations (2) and (3) for the incoherent PSF provide a discrete convolution kernel as a Toeplitz convolution matrix for each wavelength:

$$h_l(y_{i'} - y_{i+i_c}; \lambda_l) = \left(\frac{D_{v'}}{\lambda R}\right)^2 K_{i'-i,l} \quad (10)$$

where the convolution kernel is:

$$K_{\Delta i', l} = \quad (11)$$

$$\mathrm{sinc}^2\left(\frac{\Delta i' - i_c}{N_\lambda}\right)\frac{1}{N_d^2}\left|\sum_{k=0}^{N_d} P_{k,l}\exp\left[-i\frac{2\pi}{N_\lambda}\left(k - \frac{N_d+1}{2}\right)(\Delta i' - i_c)\right]\right|^2$$

$$\Delta i' = i' - i, i = \overline{1,N}, i' = \overline{1,N_y}, l = \overline{1,L}$$

$$N_\lambda = \frac{\lambda R}{\Delta v' \delta_y}. \quad (12)$$

and $P_{k,l}$ is defined by Eq. (9). Note that array $K_{\Delta i',l}$ for fixed $l=\overline{1,L}$ has a range $\Delta i'=\overline{-(N-1),(N_y-1)}$ and therefore includes $N_y+N-1$ elements. The voxels of the data cube can be expressed as:

$$X_{i,l}^{(j)} = I(x_j, y_{i+i_c}; \lambda_l), i=\overline{1,N}, j=\overline{1,N_x}, l=\overline{1,L}. \quad (13)$$

A discrete version of the ideal image intensity in each spectral band $l=\overline{1,L}$ of the data cube is represented by a $N_x \times N \times L$ array:

$$X = (X_{i,l}^{(j)}, i=\overline{1,N}, j=\overline{1,N_x}), \quad (14)$$

In other words, X is a matrix that represents a spatial-spectral data cube.

Assuming that the optical system allows only 1D dispersion such that the two spatial dimensions x, y of the image are not mixed, each column of a DD image can be considered separately. Each column includes the image data (for the image matrix) and the corresponding transfer function (PSF matrix). Moreover, because the dispersion is only 1D, the columns of the PSF are identical, which allows to drop the column index j for the PSF. Therefore, at each wavelength, Eq. (4) of the continuous 1D convolution can be rewritten as a discrete 1D convolution applied separately for each of $N_x$ image columns. The contribution of light with single wavelength $\lambda_l$ to discrete pixels of the DD image can be expressed in discrete form as $$I'(x_j, y_{i'}; \lambda_l) = \left(\frac{D_{v'}}{\lambda R}\right)^2 \delta_y \sum_{i=1}^{N} K_{i'-i,l} X_{i,j,l}, \quad (15)$$

$$i' = \overline{1,N_y}, j = \overline{1,N_x}, l = \overline{1,L}$$

where j is the number of a column in the DD image as well as in the data cube and $K_{i'-i,l}$ are elements of a Toeplitz "convolution matrix". Equation (15) shows that in a single spectral band, light intensity formed by the imaging lens on the image sensor is described as the discrete convolution of the data cube and elements of a Toeplitz matrix, defined by Eqs. (10) and (11).

SSI Apparatus with Randomizer

Figure 2A:
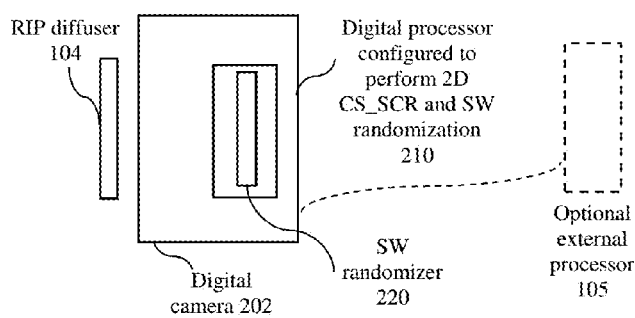
FIG. 2A shows schematically another embodiment of another (SSI apparatus disclosed herein, based on digital camera with RIP diffuser and SW randomizer.
Figure 2B:
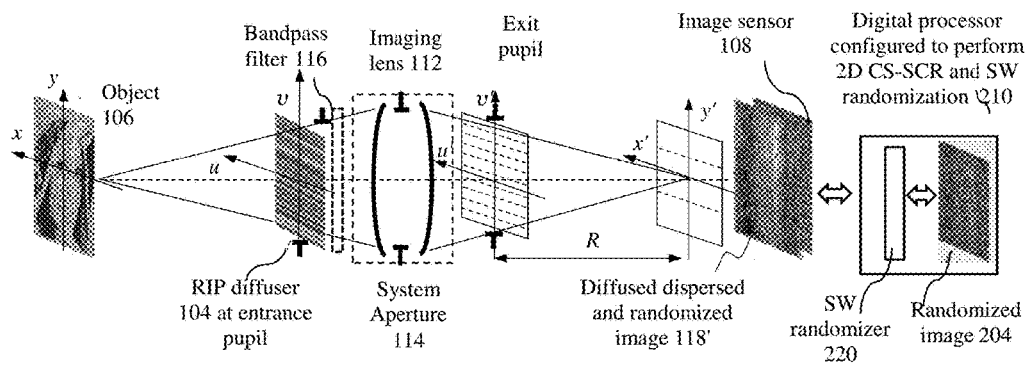
FIG. 2B shows more details of the apparatus of FIG. 2A.

FIG. 2A shows schematically an embodiment numbered 200 of another SSI apparatus based on a digital camera 202 with RIP diffuser 104 and SW randomizer 220 implemented by configuring the digital processor 210 that is a part of the digital camera 202. More details of apparatus 200 are shown in FIG. 2B. Elements common to apparatus embodiments 100 and 200 are marked with the same numerals, have similar functions and are therefore not described in detail. Apparatus 200 also includes a SW randomizer 220. SW randomizer 220 is a software implemented randomizer "function" operating at the image sensor plane. The randomizer provides a diffused, dispersed and randomized image 118' on image sensor 108. A digital processor 210' is configured to perform 2D-CS SCR on the randomized image. Spectral images are then reconstructed from the diffused, dispersed and randomized image 118'.

Figure 2C:
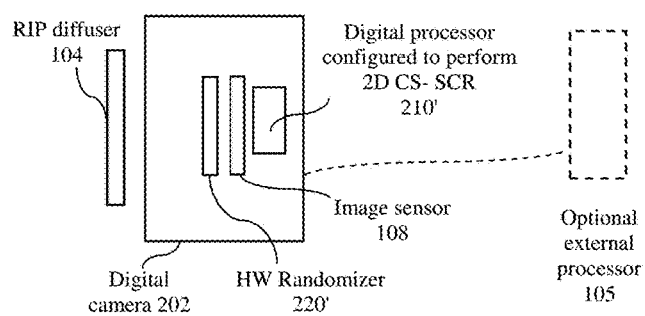
FIG. 2C shows schematically another embodiment of another SSI apparatus disclosed herein, based on digital camera with RIP diffuser and HW randomizer.
Figure 2D:
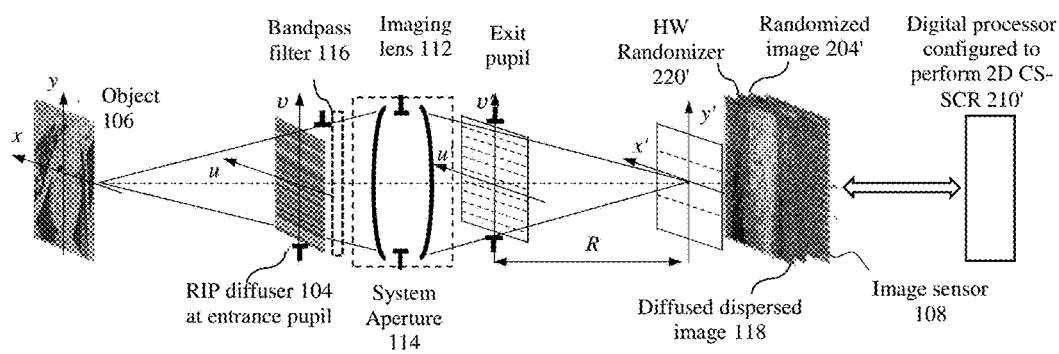
FIG. 2D shows more details of the apparatus embodiment of FIG. 2C.

FIG. 2C shows schematically an embodiment numbered 200' of another SSI apparatus based on a digital camera with RIP diffuser and HW randomizer More details of apparatus 200' are shown in FIG. 2D. Elements common to apparatus embodiments 100 and 200' are marked with the same numerals, have similar functions and are therefore not described in detail. Apparatus 200' includes a HW randomizer 220'. The randomizer provides a randomized image 204' on image sensor 108. Digital processor 210' is configured to perform 2D-CS SCR on the randomized image. Spectral images are then reconstructed from the randomized image.

The RIP diffuser in the embodiments of FIG. 2 is shown located before the imaging lens (in the optical path from the source object to the image sensor). In other embodiments, the RIP diffuser may be located inside or after the imaging lens, preferably at the entrance pupil of the imaging lens.

Contribution of the Randomizer

The randomizer randomizes the Toeplitz structure of the initial measurement matrix and allows reconstruction for reasonably sparse real images. The randomizer can be represented as a 2D matrix with random elements $R_{i',j}$, $i'=\overline{1,N_y}$. It is wavelength-independent and affects solely the amplitude of the signal on the sensor. It has the same effect on the measured intensity of light at each wavelength. This effect is a multiplication of the intensity of light at each DD image pixel $I'(x_j, y_i; \lambda_l)$ over the corresponding element $R_{i',j}$ to obtain the randomized, DD image. The insertion of the randomizer alters Eq. (15) by adding an element-wise multiplication $$R_{i',j} I'(x_j, y_i; \lambda_l), i=\overline{1,N}, i'=\overline{1,N_y}, l=\overline{1,L}, j=\overline{1,N_x} \quad (16)$$

where only a single column ($R_{i',j}$, $i'=\overline{1,N_y}$) of the randomizer matrix $R=(R_{i',j}, i'=\overline{1,N_y}, j=\overline{1,N_x})$ is used for each column of the DD image. The mathematical equations developed herein apply as well to a system without randomizer by setting <OK>

$$R_{i',j}=1, i=\overline{1,N}, i'=\overline{1,N_y}, l=\overline{1,L}, j=\overline{1,N_x} \quad (17)$$

In one embodiment, the randomizer may be implemented as an algorithm and software code for the digital processor of a photo or video camera or an external to camera laptop or desktop computer. In another embodiment, the randomizer may be implemented as hardware, in particular as an optical element placed between the imaging lens and an image sensor of photo or video camera, preferably in close vicinity to, or mounted on the image sensor.

The contribution of light with an entire set of wavelengths to discrete pixels of the DD image in CS for spectral imaging is denoted as $Y_{i'}^{(j)}$ and can be expressed as a sum of the intensities of DD images over all the wavelengths at each image sensor pixel to obtain the sensed intensity:

$$Y_{i'}^{(j)} = \left(\frac{\lambda R}{D_{v'}}\right)^2 \frac{1}{\delta_y} \sum_{l=1}^{L} \kappa_l R_{i',j} I'(x_j, y_{i'}; \lambda_l) = \sum_{l=1}^{L} \sum_{i=1}^{N} A_{i',i,l}^{(j)} X_{i,l}^{(j)}, \quad (18)$$

The non-negative numbers $\kappa_l$ (in our computer simulations below $\kappa_l=1$) characterize a relative spectral sensitivity of the image sensor at wavelength $\lambda_l$, and coefficients $A_{i',i,l}^{(j)}$ describe the combined effect of the RIP diffuser and the randomizer $R_{i',j}$, $$A_{i',i,l}^{(j)} = R_{i',j} B_{i',i,l}, i=\overline{1,N}, i'=\overline{1,N_y}, l=\overline{1,L}, j=\overline{1,N_x} \quad (19)$$

$$B_{i',i,l} = \kappa_l K_{i'-i,l}, i=\overline{1,N}, i'=\overline{1,N_y}, l=\overline{1,L} \quad (20)$$

Therefore, the randomizer breaks the Toeplitz structure of the sensing matrix at each wavelength, creating an even more random structure for the signal. It changes randomly the amplitude received by each image sensor pixel, thus improving the ability to fulfill the RIP condition.

In an embodiment with a single version of a randomizer ("single randomization" action), multiplication at the images sensor pixels of the acquired DD image pixels with the gray-level pixels of the randomizer may render some of the image sensor pixels actually unused. For example zero or near-zero values of randomizer pixels will cause respective image sensor pixels to appear as zero or near-zero, i.e. actually missing. Use of such a randomizer may lead to some loss of light flux and to a reduction in the throughput and sensitivity of the SI camera. The latter are however very important for reduction of noise in a SI camera with a RIP diffuser and monochromatic image sensor. High throughput and sensitivity of a SI camera as disclosed herein may be achieved by using multiple versions of the SW randomizer (also referred to as "multiple randomization"), described below.

Compressed Sensing Formulation

It appears convenient for mathematical considerations to concatenate spectral and vertical spatial dimensions in a data cube, i.e. to substitute two indices i,l by a single index in arrays $X_{i,l}^{(j)}$ and $A_{i',i,l}^{(j)}$. Accordingly, we resort to 1D vectors $X^{(j)}$ with enlarged length NL:

$$X^{(j)} = (X_{i,l}^{(j)}, i=\overline{1,N}, l=\overline{1,L}) = \begin{pmatrix} \begin{pmatrix} X_{1,j,1} \\ \vdots \\ X_{N,j,1} \end{pmatrix} \lambda_1 \\ \vdots \\ \begin{pmatrix} X_{1,j,L} \\ \vdots \\ X_{N,j,L} \end{pmatrix} \lambda_L \end{pmatrix}, j=\overline{1,N_x} \quad (21)$$

The entire set of $N_x$ column vectors $X^{(j)}$, $j=\overline{1,N_x}$ can be merged into a matrix $$X=[X^{(j)}, j=\overline{1,N_x}]=[X^{(1)}, X^{(2)}, \ldots, X^{(N_x)}] \quad (22)$$

with size $NL \times N_x$, which contains all the spectral cube's data. The matrix X can be alternatively split into L spectral dimensions $$X = \begin{bmatrix} X_1 \\ X_2 \\ \vdots \\ X_L \end{bmatrix} \quad (23)$$

such that each spectral dimension is described by a sub-matrix $X_l$ of size $N \times N_x$. A $N_y \times NL$ dimensional sensing matrix $$A=(A_{i',i,l}, i'=\overline{1,N_y}, i=\overline{1,N}, l=\overline{1,L}), \quad (24)$$

can be treated as a block-wise rectangular matrix $A=[A_1, A_2, \ldots, A_L]$ composed of L sub-matrices $A_l$ of size $N_y \times N$ each. Each sub-matrix $A_l$ corresponds to a single wavelength. Matrix A provides a high level of randomization by integrating effects of the RIP diffuser and (when present) of the randomizer. We also define a vector of the DD image:

$$Y^{(j)} = (Y_{i'}^{(j)}, i'=\overline{1,N_y}) = \begin{pmatrix} Y_1^{(j)} \\ \vdots \\ Y_{N_y}^{(j)} \end{pmatrix}, j=\overline{1,N_x} \quad (25)$$

Note that vector $X^{(j)}$ is the data we wish to reconstruct from the one-column sensed vector $Y^{(j)}$. The entire set of $N_x$ column vectors $Y^{(j)}$, $j=\overline{1,N_x}$ can be merged into a matrix of sensed intensity $$Y=[Y^{(j)}, j=\overline{1,N_x}]=[Y^{(1)}, Y^{(2)}, \ldots, Y^{(N_x)}]$$

with size $N_y \times N_x$. Matrix X is the spectral data we wish to reconstruct from sensed intensity matrix (or snapshot image) Y. Eq. (17) can now be expressed in a matrix form as a multiplication of a vector with length NL over a matrix with dimensions $N_y \times NL$. The multiplication results in a vector with a smaller length $N_y$:

$$Y^{(j)} = AX^{(j)}. \quad (26)$$

Accordingly, for the 2D data processing, merged vectors and matrices can be expressed in matrix form as a multiplication of a matrix of size $N_y \times NL$ with a matrix with dimensions $NL \times N_x$, resulting in a matrix of smaller size $N_y \times N_x$:

$$Y=AX. \quad (27)$$

Equation (26) provides the CS model for each column j, and Eq. (27) provides the CS model for the entire two-dimensional DD image at the image sensor. The CS problem is in reconstruction of a matrix X such that to satisfy Eq. (27) with a given matrix Y.

Due to the compressibility property of the source object, this object can be sparsely represented in a space in which it is sparse. The sparse representation of the source object can be reconstructed from the dispersed image by performing minimization of a functional that comprises the $l_2$ norm of difference between a reconstructed vector of the source object multiplied by the sensing matrix and the dispersed image. Therefore, the $l_1$ norm of the coordinates in the space in which the object is also sparse. The minimization process (with the constraint) can be exemplarily achieved via a split Bregman iteration process [Z. Cai et al., SIAM J. of Multiscale Modeling and Simulation, Vol. 8(2), pp. 337-369, 2009, hereinafter "Cai"]. This process has been known to be an efficient tool for CS reconstruction. The split Bregman iteration is an iterative algorithm involving a closed loop, with the reconstruction constrained $l_1$ error serving as the feedback to the loop and with a shrinking operation that ensures a sparse reconstruction.

Since A is a $N_y \times NL$ matrix and $L>1$, the number of unknown variables $NL \times N_x$ is larger than the number $N_y \times N_x$ of equations. Accordingly, the problem seems to be ill-posed and cannot be solved in general case. The CS sensing theory addresses, however, a specific case when matrix X is compressible and can thus be represented as a linear transform of a K-sparse matrix d in some (possibly redundant) basis, where d=DX is a matrix having only K non-zero elements with known locations and D is a sparsifying matrix. A sparsifying matrix is a matrix that converts a vector or array to a sparse matrix, i.e. to a matrix having only a small number of non-zero elements. The redundant basis may be implemented exemplarily by resorting to 2D framelet transforms, described in more detail in the "Spline-based frames for spectral image reconstruction" section below. We are hereby applying, for the first time, 2D semi-tight wavelet frames (or framelets) originating from quadratic quasi-interpolating polynomial splines to spectral image reconstruction in CS-based spectral imaging. A detailed description of spline-based frames, and, in particular the development of a variety of low-pass filters $h^0$ from interpolating and quasi-interpolating polynomial splines, may be found in A. Averbuch and V. Zheludev "Interpolatory frames in signal space", IEEE Trans. Sign. Proc., 54(6), pp. 2126-2139, 2006. A description of framelets may be found in A. Averbuch, P. Neittaanmaki and V. Zheludev, "Splines and spline wavelet methods with application to signal and image processing. Volume I: Periodic splines", Springer, 2014 (hereinafter "APZFrame"). In particular, we apply a 2D direct linear transform with a sparsifying matrix D to obtain a sparse version d of data cube X. In an embodiment, sparsifying matrix D may be the matrix of a direct 2D framelet transform, which is applied separately to each sub-matrix $X_l$, $l=1, \ldots, L$, of matrix X:

$$d = DX \Leftrightarrow \begin{pmatrix} DX_1 \\ DX_2 \\ \vdots \\ DX_L \end{pmatrix} = \begin{pmatrix} d_1 \\ d_2 \\ \vdots \\ d_L \end{pmatrix}. \tag{28}$$

We apply a 2D inverse linear (exemplarily a frame) transform with matrix $\Psi$ to obtain data cube X from its sparse version described by the K sparse matrix d:

$$X = \Psi d \Leftrightarrow \begin{pmatrix} \Psi d_1 \\ \Psi d_2 \\ \vdots \\ \Psi d_L \end{pmatrix} = \begin{pmatrix} X_1 \\ X_2 \\ \vdots \\ X_L \end{pmatrix}. \tag{29}$$

which is a matrix of the inverse 2D framelet transform applied separately to each sub-matrix $d_l$, $l=1, \ldots, L$, of matrix d. Y can be now expressed in the form $$Y = AX = A\Psi d = \Theta d, \tag{30}$$

where $\Theta = A\Psi$. As well known, the RIP condition of order K in CS (see E. J. Candes and T. Tao, "Decoding by Linear Programming," IEEE Trans. Information Theory 51(12): 4203-4215 (2005)) demands that any sub-matrix of $\Theta$ formed by zeroing all its columns, except for less than K ones, must satisfy the inequality:

$$(1-\delta_K)\|d\|_{l_2} \le \|\Theta d\|_{l_2} \le (1+\delta_K)\|d\|_{l_2}. \tag{31}$$

for any K-sparse vector d, where $\delta_K>0$ is some small number, and $\|d\|_{l_2} = \sqrt{\Sigma|d_i|^2}$. It is known that a stable solution d (and consequently X) of Eq. (28), even with a reduced number $N_y$ such that $K<N_y<NL$ of projections, exists and can be found for matrices $\Theta=A\Psi$ that satisfy a RIP condition of order K.

One of the best known examples for a sensing matrix satisfying the RIP condition is a random matrix or random Toeplitz matrix formed by Gaussian random variables with zero mean and 1/NL variance. In this case, the columns are approximately orthogonal and the RIP condition is satisfied with high probability if:

$$N_y \ge C \frac{K}{\log\left(\frac{NL}{K}\right)} \tag{32}$$

where $0<C\le1$ is a constant. We reconstruct the spectral cube X from a given matrix Y by solving the following constrained minimization problem:

$$\min_X |DX|_{l_1} \text{ subject to } \|AX - Y\|_{l_2} \le \sigma, \tag{33}$$

where DX is the block-wise 2D framelet transform of the matrix X as in Eq. (25), the $l_1$ norm of a vector a is $|a|_{l_1} = \Sigma|a_i|$, $\|a\|_{l_1} = \Sigma|a_i|$ and $\sigma$ is a predetermined stopping threshold.

An approach to solve the minimization problem Eq. (33) was presented in Cai. The process works by introducing several additional variables, which are treated separately. In more detail, following the analysis performed there, the minimization for a linear operator A is performed by an iterative process $$\begin{cases} X^{k+1} = (\mu A^T A + \chi I)^{-1} [\mu A^T(-c^k) + \chi D^T(d^k - b^k)] \\ d^{k+1} = \text{shrink}\left(DX^{k+1} + b^k, \frac{1}{\chi}\right) \\ b^{k+1} = b^k + \delta_b(DX^{k+1} - d^{k+1}) \\ c^{k+1} = c^k + \delta_c(AX^{k+1} - Y) \end{cases} \tag{34}$$

where k is a number of iteration, $d^k$, and $c^k$ are the intermediate vectors, used to execute iterations, $A^T$ denotes a transposed matrix A and $$\text{shrink}(x,\gamma) = sgn(x)\max(|x|-\gamma, 0). \tag{35}$$

is a function applied to each component of a matrix. The parameters of the process $\mu$, $\chi$ (where $\chi^{-1}$ is a shrinkage threshold) enable to give different significance or weight to the terms in the problem: $\|AX^{k+1}-Y\|_{l_2}$, $|DX^{k+1}|_{l_1}$. A change of the parameters enables essentially convergence to a solution by assigning different weights to sparsity level of d (larger $\chi$), or better fit to AX=Y (larger $\mu$). The reconstruction process guarantees a satisfactory reconstruction of the source object if the sensing matrix satisfies a RIP condition expressed in Eq. (28). The iterations are terminated, once the inequality $\|AX^{k+1}-Y\|_{l_2} \le \sigma$ (where $\sigma$ is a stopping threshold) is achieved.

After completion of the iterations, we have the compressible block-wise matrix for the reconstructed data cube:

$$X = \Psi d \tag{36}$$

comprising sub-matrices $X_l = \Psi d_l$, $l=1, \ldots, L$, where the sparse block-wise matrix $d=DX$. Reconstructed data cube components $X_l = \Psi d_l$ containing a reconstructed image in each spectral band are then represented by a matrix with size $N \times N_x$ $$\begin{pmatrix} X_{1,l}^{(1)} & \cdots & X_{1,l}^{(N_x)} \\ \vdots & & \vdots \\ X_{N,l}^{(1)} & \cdots & X_{N,l}^{(N_x)} \end{pmatrix}$$

where $l=\overline{1,L}$ is the index of the corresponding spectral band. Comparison between the reconstructed X and the ideal $\overline{X}=(\overline{X}_{i,l}^{(j)})$ image may be performed by calculation of PSNR:

$$PSNR_l = 20 \log \left( \frac{\max \overline{X}_{i,l}^{(j)}}{\sqrt{\frac{1}{N_x N} \sum_{i=1}^{N} \sum_{j=1}^{N_x} [X_{i,l}^{(j)} - \overline{X}_{i,l}^{(j)}]^2}} \right), l = \overline{1, L} \quad (37)$$

at each spectral band.

RIP Diffuser Design with Permutations of Saw-tooth Diffraction Grating

An exemplary 1D RIP diffuser implementation was described in US 20130194481. In mathematical terms, it is however convenient to scale it to the size of the exit pupil by a coefficient of pupil magnification. The grooves of the RIP diffuser in US 20130194481 were designed for a specific wavelength $\lambda_{des}$ with phase levels as shown in FIG. 9B therein, and implemented as micro-relief horizontal lines. Each line with number k is characterized by a width $\Delta \upsilon'$ and a random groove depth $h_k$, as illustrated exemplarily in FIGS. 9C and 9D therein. In more detail and as described in US 20130194481, as a 1D element, the RIP diffuser becomes an array of vertical straight line strips with random groove depths.

The RIP diffuser includes $N_d$ vertical straight line strips extending parallel to the u' axis, with widths $\Delta \upsilon'$ and centers $\upsilon_k'$ defined in Eq. (7). The groove depths $h_k$ are constant within the width $\Delta \upsilon'$ of a $k^{th}$ strip. Each groove depth h causes at a wavelength $\lambda$ a corresponding phase shift $\phi_{k,des}$ given by the following paraxial case equation:

$$\varphi(v'; \lambda) = \frac{2\pi}{\lambda}[n(\lambda) - 1]h, \quad (38)$$

where $n(\lambda)$ is the refractive index at wavelength $\lambda$. Since the phase is wavelength-dependent, each groove depth adds a different phase to light with a different wavelength. The phase additions for two different wavelengths are related by:

$$\frac{\varphi(v'; \lambda_1)}{\varphi(v'; \lambda_2)} = \frac{\lambda_2}{\lambda_1} \frac{n(\lambda_1) - 1}{n(\lambda_2) - 1} \cong \frac{\lambda_2}{\lambda_1}$$

The approximation in previous equation can be applied because the refractive index n slowly varies with the wavelength. Therefore, if the mask grooves are designed for a specific wavelength $\lambda_{des}$, the mask's impact on light with wavelength $\lambda$ is:

$$\varphi(v'; \lambda) = \frac{\lambda_{des}}{\lambda} \frac{n(\lambda) - 1}{n(\lambda_{des}) - 1} \varphi(v'; \lambda_{des}) \cong \frac{\lambda_{des}}{\lambda} \varphi(v'; \lambda_{des}) \quad (39)$$

In view of Eq. (36), the phase provided by the RIP diffuser can be described as $$\varphi_{k,des} = \frac{2\pi}{\lambda_{des}}[n(\lambda_{des}) - 1]h_k \quad (40)$$

where $\phi_{k,des}$ is phase at the design wavelength $\lambda_{des}$ at a straight line strip number k on the RIP diffuser, $\lambda_l$ is a central wavelength of a of spectral band number l, $l=\overline{1,L}$ and L is the total number of spectral bands.

The coherent point spread function $h(y'; \lambda)$ associated with the RIP diffuser is also 1D, depending only on coordinate y' at the image plane, and can be calculated as inverse Fourier transform of the piecewise constant pupil function. Resorting to a known result of the Fourier transform of a rect function as a sin c function:

$$\text{sinc}(\xi) = \frac{\sin(\pi \xi)}{\pi \xi} \quad (41)$$

and resorting to shift properties yields:

$$h(y'; \lambda_l) = \frac{1}{iR} \sum_{k=0}^{N_d} P_{kl} \int_{-0.5D_y}^{0.5D_y} rect\left(\frac{v' - v_k'}{\Delta v'}\right) \exp\left(i2\pi \frac{v' y'}{\lambda R}\right) dv' \quad (42)$$

$$= \frac{D_{v'}}{iR} \text{sinc}\left(\frac{\Delta v'}{\lambda R} y'\right) \frac{1}{N_d} \sum_{k=0}^{N_d} P_{kl} \exp\left(i2\pi v_k' \frac{y'}{\lambda R}\right),$$

where $\upsilon_k'$ and $\Delta \upsilon'$ are the location and the width of the k-th straight line strip in a 1D RIP diffuser respectively, $P_{kl}$ is constant within a width $\Delta \upsilon'$ of the $k^{th}$ strip on the RIP diffuser and was defined in Eq. (9) through a phase shift $\phi_{k,l}$, and $k=\overline{1,N_d}$ $\lambda_l$ is a central wavelength of a spectral band number $l=\overline{1,L}$. Thus, the PSF (for amplitude) is a sum of sin c functions centered on the sensor center with different, diffuser dependent coefficients, and a width defined by an inverse width of the constant phase lines on the diffuser.

Figure 3A:
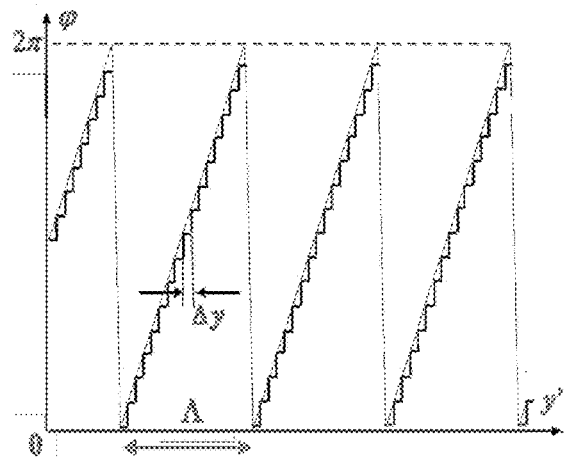
FIG. 3A shows graph of saw-tooth phase for an embodiment of the RIP diffuser design.

In an embodiment disclosed herein, the RIP diffuser design is developed further as follows. The RIP diffuser may be installed at, or in a vicinity of, the entrance pupil of the imaging system. However, in mathematical equations it is convenient to scale it to the size of the exit pupil by a coefficient of pupil magnification. In an embodiment, the RIP diffuser is a 1D thin phase optical element providing changes in phase of an optical light field in a single operating direction and including line grooves extending perpendicular to the operating direction. The RIP diffuser is fabricated of transparent material with the refractive index $n(\lambda)$ and consists of $N_d$ vertical straight line strips extending parallel to u'. The depths and phases are constant within the width $\Delta \upsilon'$ of $k^{th}$ strip and quantized to $N_Q$ discrete phase levels equidistant from each other with a phase difference of $2\pi/N_Q$. In an embodiment presented here, the design for the RIP diffuser started with a blazed diffraction grating with a saw-tooth profile, as shown in FIG. 3A. The blazed diffraction grating has a period $\Lambda$ in direction of $\upsilon'$ axis and has accordingly a periodic saw-tooth phase function $$\pi \, \text{mod}_{2\pi}(2\pi\upsilon'/\Lambda), \qquad (43)$$

where $\text{mod}_{2\pi}(\bullet)$ function denotes a minimum positive residue of the argument, after subtracting multiples of $2\pi$. The phase function was quantized to $N_Q$ discrete phase levels such that the strip widths are $\Delta\upsilon'=\Lambda/N_Q$. The total number of strips was chosen to be $$N_d = D_y/\Delta\upsilon' = N_Q D_y/\Lambda \qquad (44)$$

In an embodiment, a quantized saw-tooth array was created with a number of points $N_Q$ in every cycle corresponding to the number of groove depth levels, and with a total number of pixels $N_d$. Consequently, each point k in the saw-tooth array represents the phase value for one strip:

$$\pi \text{mod}_{2\pi}(2\pi\upsilon_k'/\Lambda). \qquad (45)$$

In this embodiment, the number of groove depth levels $N_Q$ and the blazing period $\Lambda$ are limited by practical considerations, i.e. fabrication rules for feature-size and the number of groove depth levels. However, other embodiments may use different numbers of groove depth levels and blazing periods.

Figure 3B:
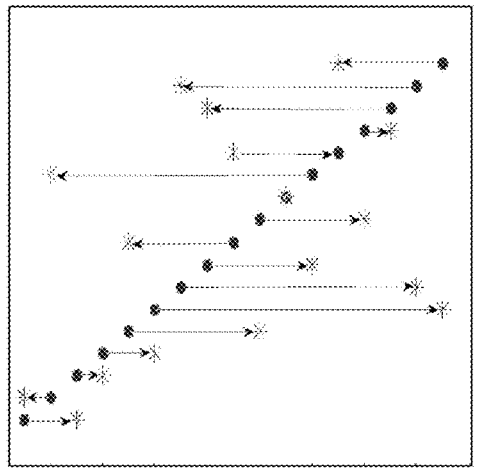
FIG. 3B shows permutation of pixels for another embodiment of the RIP diffuser design.

A randomization of a 1D blazed saw-tooth array was executed by a spatial permutation of the indices $k=\overline{1,N_d}$, i.e. by random change of pixel positions of the pixels, as shown in FIG. 3B. This provided a "randomized saw-tooth structure" of the RIP diffuser, as shown in FIG. 3C. FIG. 3D shows a typical gray level representation of the RIP diffuser. New random values of pixel position indices are selected by using a random (exemplarily a uniform) distribution from the set of possible indices in the array, by resorting exemplarily to permutation function "randperm" in MATLAB. "randperm" is defined as follows: randperm(n) returns a random permutation of the integers 1:n (using a uniform distribution of integer numbers in the range 1:n).

HW Randomizer Design

A HW randomizer has a pixelated structure with pixel size and arrangement matching exactly those of the image sensor. Thus, each pixel on the image sensor receives its portion of the intensity of a randomized image created by the diffuser multiplied by a random coefficient. A HW randomizer may be made of any material transparent in the wavelength range of interest, for example glass or plastic. Each HW randomizer pixel has a random transparency value between fully transparent and fully opaque. The HW randomizer is positioned in the optical path between RIP diffuser and image sensor, preferably adjacent to (or alternatively exactly at) the image sensor plane. The randomizer breaks the block Toeplitz structure of the measurement matrix, thus creating a random structure for the signal. It changes randomly the amplitude received by each pixel of the image sensor, thus improving the ability to hold the RIP condition.

In some embodiments, the randomizer design uses pseudo-random numbers from a function to create a matrix of the same size as the image sensor pixel matrix. The values for elements of the randomizer matrix are random, given preferably by independent Gaussian random variables with a standard normal distribution, whose probability density is of the form:

$$P_{normal}(x) = \frac{1}{\sqrt{2\pi}} \exp\left(-\frac{x^2}{2}\right) \qquad (46)$$

Note that other probability densities may be used for this purpose. In other embodiments, values for elements of the randomizer matrix can be either uncorrelated random variables or pixels of a 1D or 2D random process or field, described by recurrent equations, which are well known to those of ordinary skill in the art. In still other embodiments, values for elements of the randomizer matrix can be deterministic and be defined by a closed form equation, for example an array of lenslets with equal or variable phase shift between the individual lenslets.

Figure 4:
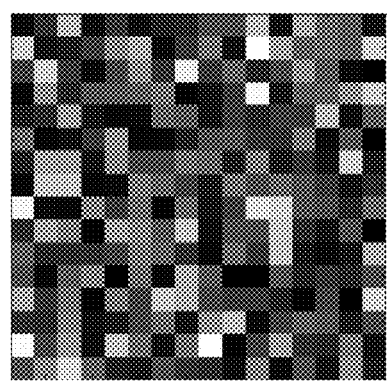
FIG. 4 shows an exemplary randomizer design with 16×16 pixels.

FIG. 4 shows an exemplary random transparency randomizer design with 16×16 pixels. This design may of course be extended to any size to match all image sensor pixels. The randomizer is wavelength-independent, as it changes only the intensity of the light arriving at the sensor and not its phase, It thus has the same effect for each wavelength and changes each block of the measurement matrix in the same way, as described above. Such a randomizer can be fabricated quite easily by making an analogue photograph of a random matrix with a number of elements corresponding to the number of pixels on the sensor. The results may be an image on film having the right size (to cover the image sensor) and the correct resolution.

SW Randomizer

The values for elements of the SW randomizer matrix may be same as described above for the HW randomizer. In addition, apparatus and method embodiments with a SW randomizer may use either single randomization or multiple randomization. The latter uses multiple random versions of a SW randomizer, in which zero pixels of one version are followed by non-zero pixels of another version at the same positions on the detector. This results in statistical averaging of the randomization action and enables the entire light flux acquired by the detector to be used efficiently. In an embodiment, the data cube reconstruction algorithm is then run separately with each version of the SW randomizer to provide several versions of a reconstructed data cube. These may be then merged by simple averaging per pixel or, alternatively, by image fusion algorithms. In another embodiment, the data cube reconstruction may be performed using an algorithm that employs a class of measurement matrices that differ only in the SW randomizer version, while relying on the same RIP diffuser. In this embodiment, a single iterative process with multiple random versions of the randomizer will provide directly the reconstructed data cube, based on all the detector pixels.

The "multiple randomization" process may also be described as follows: more randomizing may be provided by resorting to several independent versions $R^{(1)}$, $R^{(2)}$, . . . , $R^{(N_R)}$ of the randomizer matrix R, taken from the statistical ensemble. The CS iterations may then be run separately for each $R^{(i_R)}$ $i_R=1, \ldots, N_R$. The iterations result in a set of $N_R$ different randomized images at the image sensor plane, obtained in accordance with Eq. (16) from the same DD image Eq. (15) by software. Several (i.e. "$N_R$") reconstructed data cubes may then be averaged or fused together by software, to have a single solution for the data cube. While this may require increased processing resources, it may result in an increased effective sensitivity of the SI camera by using the entire light flux acquired by the camera.

Spline-based Frames for Spectral Image Reconstruction

Here we describe in more detail the spline-based frames (or framelets) for spectral image reconstruction in CS-based spectral imaging. Spline-based frames, and in particular the development of a variety of low-pass filters $h^0$ from interpolating and quasi-interpolating polynomials splines was reported previously, see e.g. A. Averbuch and V. Zheludev, "Construction of bi-orthogonal discrete wavelet transforms using interpolatory splines", Applied and Computational Harmonic Analysis, 12, 25-56, 2002, A. Averbuch, A. B. Pevnyi, and V. A. Zheludev, "Bi-orthogonal Butterworth wavelets derived from discrete interpolatory splines", IEEE Trans. Signal Processing, 49(11), 2682-2692, 2001, and APZFrame. The spline-based framelet transforms are applied to successive approximations $X^k$ that are derived from the randomized input in the process of Bregman iterations.

A system $\tilde{\Psi}=\{\tilde{\phi}_l\}_{l=0}^{L-1}$, L>N of signals from $\Pi[N]$, which is a space of N-periodic signals, forms a frame of the space $\Pi[N]$ if there exist positive constants A and B such that for any signal $x=\{x[k]\}\in\Pi[N]$ the following inequalities $$A\|x\|^2 \le \sum_{l=0}^{L-1} |\langle x, \tilde{\phi}_l\rangle|^2 \le B\|x\|^2$$

hold. If the frame bounds A=B, the frame is said to be tight. If $\tilde{\Phi}$ is a frame, then there exists another frame $\Phi=\{\phi_l\}_{l=0}^{L-1}$ (synthesis) such that any signal $x=\{x[k]\}\in\Pi[N]$ is represented by $$x = \sum_{l=0}^{L-1} \langle x, \tilde{\phi}_l\rangle \phi_l.$$

If $\tilde{\Phi}$ (also called "analysis" frame) is tight, then the synthesis frame can be $\Phi=\tilde{\Phi}$.

The analysis four-channel filter bank $\tilde{H}=\{\tilde{h}^s\}_{s=0}^3$ and the synthesis filter bank $H=\{h^s\}_{s=0}^3$, with down-sampling factor of 2, form a perfect reconstruction (PR) filter bank if any signal $x=\{x[k]\}\in\Pi[N]$ can be expanded as:

$$x[l] = \sum_{s=0}^{3} \sum_{k=0}^{N/2-1} h^s[l-2k]d^s[k], \quad (47)$$

$$l = 0, \ldots, N-1,$$

$$d^s[k] = \sum_{m=0}^{N-1} \tilde{h}^s[m-2k]x[m] = \langle x, \tilde{h}^s[\cdot - 2k]\rangle,$$

$$s = 0, 1, 2, 3, k = 0, \ldots, N/2-1.$$

Equation (47) provides a frame expansion of the signal x, where the signals $\{\tilde{h}^s[\cdot-2k]\}$, s=0, . . . , 3, k=0, . . . , N/2-1, constitute an analysis frame, while the signals $\{h^s[\cdot-2k]\}$, s=0, . . . , 3, k=0, . . . , N/2-1, form a synthesis frame.

Denote by $x_0=\{x[2k]\}\in\Pi[N/2]$ and by $x_1=\{x[2k+1]\}$ the even and the odd polyphase components of a signal $x\in\Pi[N]$, respectively. Denote $\omega=e^{2\pi i/N}$.

$$\hat{x}[n] = \sum_{k=0}^{N-1} \omega^{-kn}x[k] \text{ and } \hat{x}_p[n] = \sum_{k=0}^{N/2-1} \omega^{-2kn}x_p[k],$$

$$p = 0$$

are the discrete Fourier transform (DFT) of signal x and its polyphase components. $h_p^s$ and $\tilde{h}_p^s$, p=0, 1, s=0, . . . , 3, are the polyphase components of filters $h^s$ and $\tilde{h}^s$. $\hat{h}_p^s[n]$ and $\hat{\tilde{h}}_p^s[n]$, p=0, 1 are their DFT. Denote:

$$\tilde{P}[n] = \begin{pmatrix} \hat{\tilde{h}}_0^0[n] & \ldots & \hat{\tilde{h}}_0^3[n] \\ \hat{\tilde{h}}_1^0[n] & \ldots & \hat{\tilde{h}}_1^3[n] \end{pmatrix}^T \text{ and } P[n] = \begin{pmatrix} \hat{h}_0^0[n] & \ldots & \hat{h}_0^3[n] \\ \hat{h}_1^0[n] & \ldots & \hat{h}_1^3[n] \end{pmatrix}. \quad (48)$$

$\tilde{P}[n]$ and $P[n]$ are respectively the analysis and synthesis polyphase matrices of the filter banks $\tilde{H}$ and H. The symbol $(\ldots)^T$ means matrix transposition. The direct framelet transform of a signal x of length N, which produces four sets of the coefficients $d=\{d^s\}$, s=0, 1, 2, 3, each of which contains N/2 members, can be represented as:

$$\begin{pmatrix} d^0[n] \\ \vdots \\ d^3[n] \end{pmatrix} = \tilde{P}[-n]\begin{pmatrix} \hat{x}_0[n] \\ \hat{x}_1[n] \end{pmatrix}. \quad (49)$$

The inverse framelet transform, which restores the signal from coefficients $d^s$, s=0, 1, 2, 3, is:

$$\begin{pmatrix} \hat{x}_0[n] \\ \hat{x}_1[n] \end{pmatrix} = P[n]\begin{pmatrix} d^0[n] \\ \vdots \\ d^3[n] \end{pmatrix}. \quad (50)$$

Thus, the length—N signal x becomes represented by 2N coefficients from the sets $d_s$, s=0, 1, 2, 3. In that sense, this representation is doubly redundant. The relation $P[n]\tilde{P}[-n]=I_2$ (PR), where $I_2$ is the 2×2 identity matrix, is the condition for the pair $\{\tilde{H},H\}$ of filter banks to form a PR filter bank. Filters $\tilde{h}^0$ and $h^0$ from the PR filter banks $\{\tilde{H},H\}$ are low-pass.

To extend the framelet transform to the lower resolution scale and to increase the representation redundancy, the transform is applied to the low-frequency coefficients array $d^0$ using analysis polyphase matrix $\tilde{P}[2n]$. The coefficients' array $d^0$ is restored using synthesis polyphase matrix $\tilde{P}[2n]$ and $P[2n]$. Similarly, the transform is extended to further resolution scales using matrices $\tilde{P}[2^mn]$ and $\tilde{P}[2^mn]$, m=2, 3, . . . . . The 2D framelet transform of a 2D array thus includes application of a 1D transform to columns of the array, followed by application of a 1D transform to rows of the array.

In an exemplary embodiment, we designed a family of 4-channel PR filter banks with diverse coefficients (see APZFrame). Their polyphase matrices have a specific structure, which is determined by a low-pass filter whose frequency response is $\hat{h}^0[n]=\hat{h}_0^0[n]+\omega^{-n}\hat{h}_1^0[n]$:

$$\tilde{P}[n] = \begin{pmatrix} \hat{h}_0^0[n] & \hat{h}_1^0[n] \\ -\hat{h}_1^0[-n] & \hat{h}_0^1[-n] \\ \tilde{T}^2[n] & 0 \\ 0 & \tilde{T}^3[n] \end{pmatrix}, \quad (51)$$

$$P[n] = \begin{pmatrix} \hat{h}_0^0[n] & -\hat{h}_1^0[-n] & T^2[n] & 0 \\ \hat{h}_1^0[n] & \hat{h}_0^0[-n] & 0 & T^3[n] \end{pmatrix}.$$

where $T^2[n]\tilde{T}^2[-n]=T^3[n]\tilde{T}^3[-n]=1-|\hat{h}_0^0[n]|^2+|\hat{h}_1^0[n]|^2$. A filter bank generates the tight frame if $T^2[n]\tilde{T}^2[-n]=T_3[n]=$ $\tilde{T}^3[-n]$. A filter bank generates the semi-tight frame if $T^2[n] \ne \tilde{T}^2[-n], T^3[n] \ne \tilde{T}^3[-n]$. Unlike the tight-frames filter banks, filter banks generating semi-tight frames have linear phase.

In an embodiment, we use the filter bank derived from a quasi-interpolating quadratic spline (see APZFrame). This filter bank generates a semi-tight frame. The frequency responses of the analysis and synthesis filters are:

$$\hat{h}^0[n] = \hat{\tilde{h}}^0[n] = \frac{1}{\sqrt{2}} \cos^4 \frac{\pi n}{N}\left(3 - \cos\frac{2\pi n}{N}\right), \quad (52)$$

$$\hat{h}^1[n] = \hat{\tilde{h}}^1[n] = \frac{\omega^{-n}}{\sqrt{2}} \sin^4 \frac{\pi n}{N}\left(3 + \cos\frac{2\pi n}{N}\right),$$

$$\hat{h}^2[n] = T[n], \hat{h}^3[n] = -\omega^{-n}\tilde{T}[-n],$$

$$\hat{\tilde{h}}^2[n] = \tilde{T}[n], \hat{\tilde{h}}^3[n] = -\omega^{-n}T[-n],$$

where the sequences $T[n]$, $\tilde{T}[n]$ and $G[n]$ are:

$$\tilde{T}[n] = \sqrt{2}\frac{\omega^{4n} - 3\omega^{2n} + 3 - \omega^{-2n}}{8} \quad (53)$$

$$T[n] = \sqrt{2}\frac{(1-\omega^{2n})G[n]}{1024},$$

$$G[n] = -\omega^{4n} - 12\omega^{2n} + 346 - 12\omega^{-2n} - \omega^{-4n}.$$

FIG. 5 displays the graphs of impulse and magnitude responses of the filters $\tilde{H}=\{\tilde{h}^s\}_{s=0}^{3}$ and $\tilde{H}=\{h^s\}_{s=0}^{3}$ for specific frames used in an embodiment of the SI. FIG. 5A shows impulse responses of filters $h^0$ (solid line) and $h^1$ (dashed line). FIG. 5B shows magnitude responses of filters $h^0$ (solid line) and $h^1$ (dashed line). FIG. 5C shows impulse responses of the filters $h^2$ and $\tilde{h}^3$ (solid line) and $h^3$ and $\tilde{h}^2$ (dashed line). FIG. 5D shows magnitude responses of filters $h^2$ and $\tilde{h}^3$ (solid line) and $h^3$ and $\tilde{h}^2$ (dashed line).

In the process of Bregman iterations, Eqs. (33) and (34), the direct and the inverse 2D framelet transforms are repeated. Each 2D framelet transform is implemented by the application of a 1D framelet transform to columns of the matrices using fast Fourier transforms, followed by a 1D transform of the rows, Eqs. (49) and (50). Polyphase matrices $\tilde{P}[n]$ and $P[n]$ defined in Eq. (51), are used for one-level transforms, while polyphase matrices $\tilde{P}[2^m n]$ and $P[2^m n]$, $m=2, 3, \ldots$ are used for multi-level transforms.

Methods of Use

FIG. 6A shows schematically in a flow chart an embodiment of a method for SSI disclosed herein. In FIG. 6A, a snapshot image Y of an object using a diffuser that satisfies a RIP condition related to a sensing matrix A is acquired with an apparatus such as apparatus 100 in step 502. In some embodiments, the acquisition may also be done through an added randomizer A 2D sparsifying transform D applied to $A^T Y$, where $A^T$ is the transposed matrix related to sensing matrix A, is used in step 504 to obtain a sparse version d of data cube X. An inverse transform $\Psi$ is then used to reconstruct X from d in step 506. A CS iteration scheme (exemplarily split Bregman) is then used to obtain images of the object intensity in each of L spectral bands in step 508.

Figure 6B:
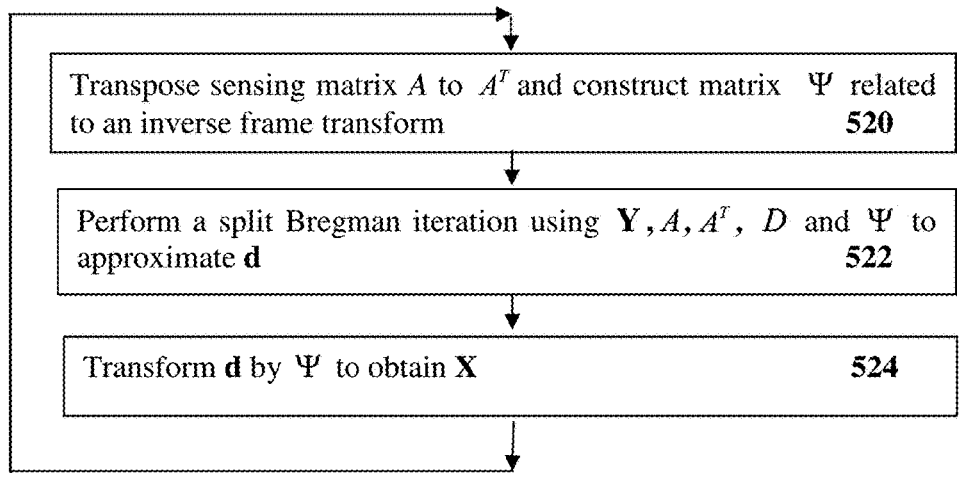
FIG. 6B shows details of step 508 in the flow chart of FIG. 6A.

FIG. 6B shows details of step 506 in the flow chart of FIG. 6A. In step 520, sensing matrix A is transposed to transpose matrix $A^T$ which is used to construct a matrix $\Psi$ related to an inverse framelet transform. In step 522, a split Bregman iteration is performed using Y, A, $A^T$, D and $\Psi$ to approximate d. In step 524, d is transformed by $\Psi$ to obtain X.

Figure 6C:
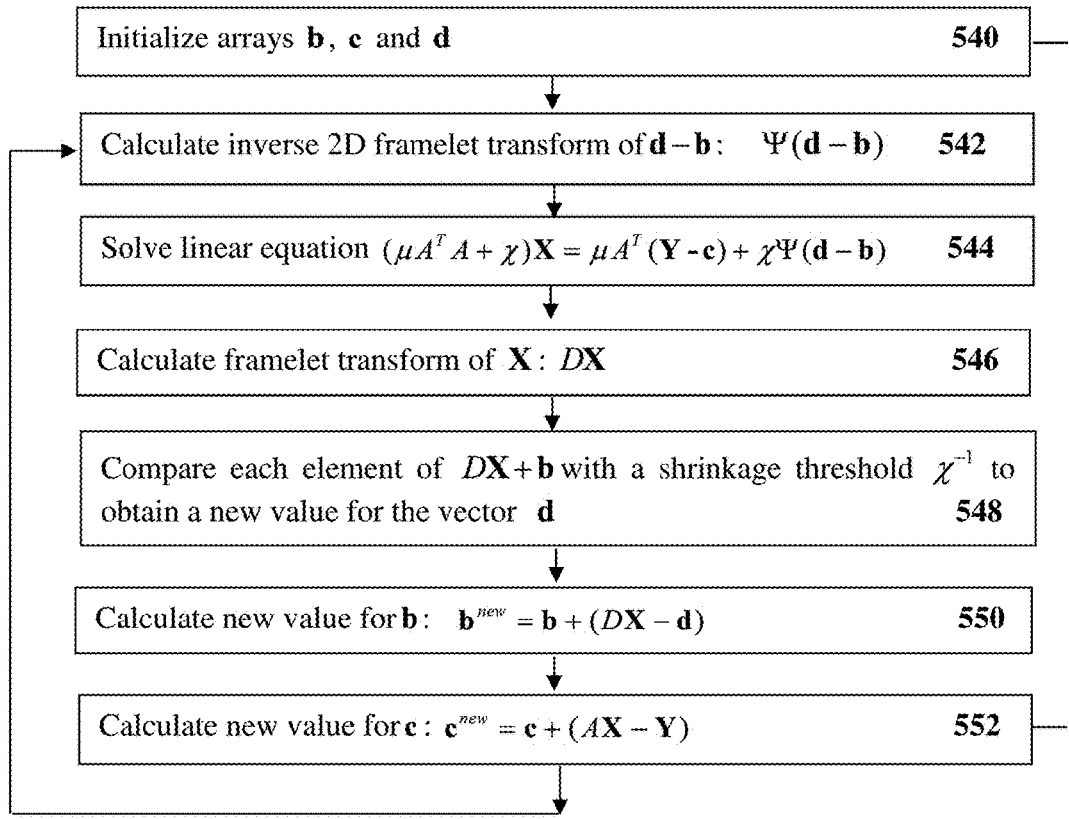
FIG. 6C shows details of step 522 in FIG. 6B for a split Bregman iteration.

FIG. 6C shows details of step 522 in FIG. 6B for a split Bregman iteration. Initialization of arrays b, c and d is done in step 540. An inverse 2D framelet transform of d−b: $\Psi(d-b)$ is performed in step 542, a linear equation $(\mu A^T A+\chi)X=\mu A^T(Y-c)+\chi\Psi(d-b)$ is solved in step 544, and a framelet transform of X: DX is performed in step 546. Each element of DX+b is compared with a predetermined shrinkage threshold $\chi^{-1}$ to obtain a new value for vector d in step 548, a new value is calculated for b: $b^{new}=b+(DX-d)$ in step 550 and a new value for c: $c^{new}=c+(AX-Y)$ is calculated in step 552. The iterations are repeated from step 542 as long as the error norm $\|AX-Y\|$ exceeds the predetermined stopping threshold $\sigma$.

Simulations of Data Cube Reconstruction

Various computer simulations of data cube reconstruction for test multispectral source objects sensed with a digital camera equipped with a 1D RIP diffuser and without or with randomizer were run. The simulations were done with Matlab software code.

Simulations of 2D CC-SCR Multispectral Images in Apparatus that Includes a Digital Camera and a 1D RIP Diffuser without Randomizer Simulation using Matlab was performed on the base of the 2D CS-SCR description above. The spectral data source was a fragment "houses" scene number 7 in D. H. Foster, "Hyperspectral images of natural scenes 2004", http://personalpages.manchester.ac.uk/staff/davidloster/Hyperspectralimages_of_natural_scenes_04.html, 2004 (hereinafter "houses in Porto"). A DD image was obtained by computer simulation of an optical imaging system that includes a digital camera having an imaging lens and a pixelated image sensor, with 1D RIP diffuser inserted in the pupil at the image sensor plane. Each column of the DD image was a linear combination of all the spectral and spatial data in the corresponding source object image column with a sensing matrix. The Bregman iteration process was applied to reconstruct spectral cube information corresponding to M voxels in each of N columns and L=33 spectral bands of the spectral cube. The result is a set of vectors, each vector including all spectral information for each pixel in the corresponding image column. All reconstructed image columns were then placed next to each other, thereby providing the entire spectral information that represents the full spectral cube. Finally, the spectral cube was processed to obtain L separate spectral images of the object by taking consecutive sets of M rows corresponding to required spectral bands. The quality of the 2D CS-SCR results was evaluated by comparing the PSNR of our results with the PSNR achieved in the reported studies. Options without or with randomizer were executed in simulation.

Table 1 summarizes the parameters of the optical system and of the designed RIP diffuser used in the simulations. The parameters fit a 10 Mp camera.

TABLE 1

| Parameter | Notation | Value |
| --- | --- | --- |
| Number of wavelengths | L | 33 |
| Number of columns in spectral cube | $N_x$ | 256 (up to # of active pixels in camera) |

TABLE 1-continued

| Parameter | Notation | Value |
| --- | --- | --- |
| Number of spectral cube pixels per column | N | 256 |
| Distance from the exit pupil of the imaging lens to the sensor | R | 19.6 mm |
| $D_{u'} = D_{v'}$ | | 6.5 mm |
| Width of stripe at the RIP diffuser | $\Delta v'$ | >4 μm |
| Number of phase quantization levels | $N_Q$ | 16 |
| Number of pixels at a column of the image sensor | $N_{y'}$ | 2048 |
| Pixel size at the image sensor | $\delta_x = \delta_y$ | 2.20 μm |
| Active imager size, mm | | 6.41 × 3.607 |
| Active pixels | | 2916 × 1640 |
| ADC resolution | | 12-bit |

Table 2 provides the minimum number of rows M on the image of the sensor required to satisfy the RIP condition Eq. (31) following Eq. (32), for an image with column size $M_{image}$, L spectral bands and 20% sparsity (the portion of the non-zero values in a "sparse" image).

TABLE 2

| N | L | LN | K = 0.2 LN | $N_{y'}$ |
| --- | --- | --- | --- | --- |
| 128 | 5 | 640 | 128 | 183 |
| 128 | 9 | 1152 | 230 | 330 |
| 128 | 24 | 3072 | 614 | 879 |
| 128 | 33 | 4224 | 844 | 1209 |
| 256 | 33 | 8448 | 1690 | 2417 |

Figure 3:
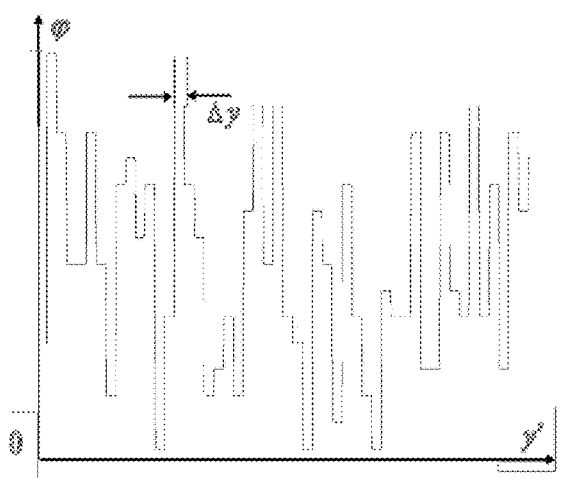
FIG. 3C shows a design for the RIP diffuser based on FIG. 2B.
FIG. 3D shows a gray level representation of the RIP diffuser design of FIG. 3C.
Figure 3:
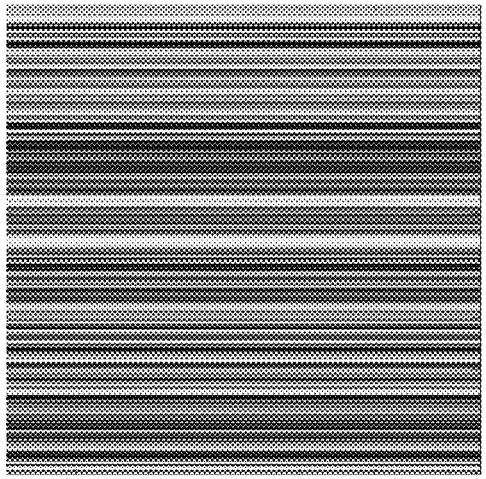
Figure 7A:
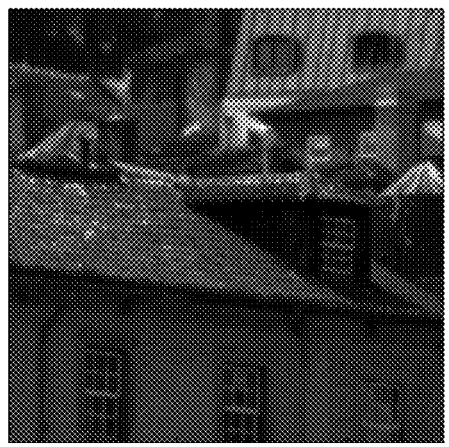
FIGS. 7A-J show results of a simulation of 2D CC-SCR on a snapshot image obtained with a digital camera equipped with a 1D RIP diffuser.
Figure 7A:
Figure 7B:
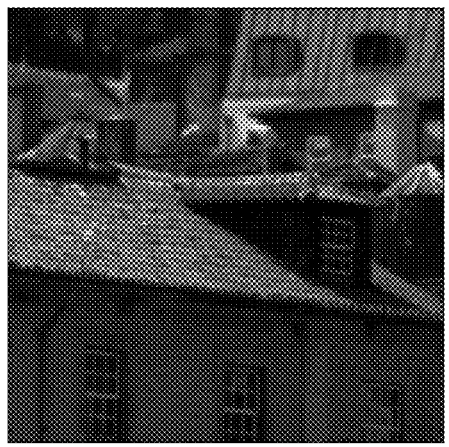
Figure 7B:
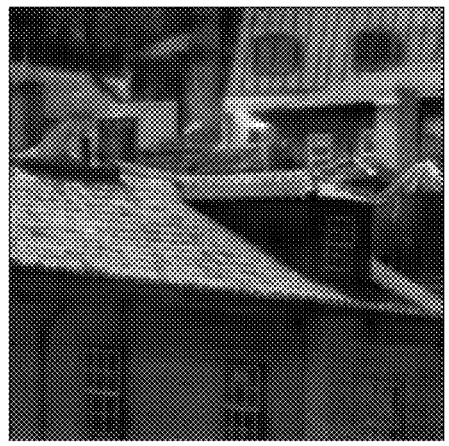
Figure 7C:
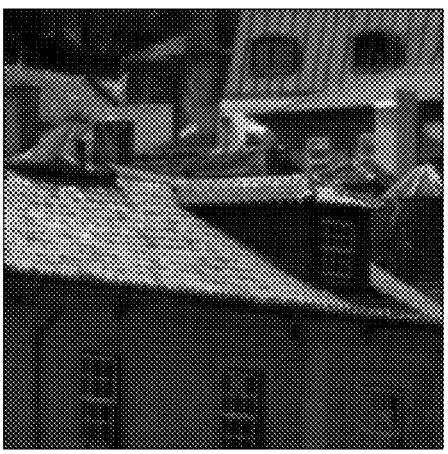
Figure 7C:
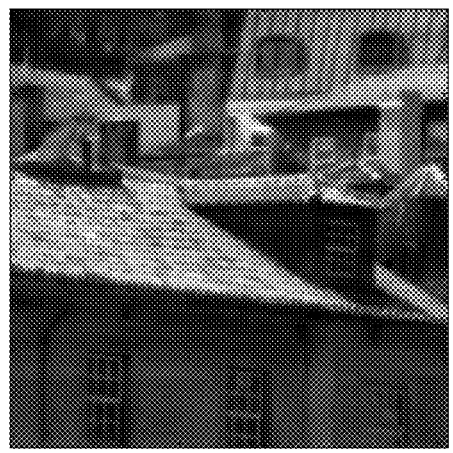
Figure 7D:
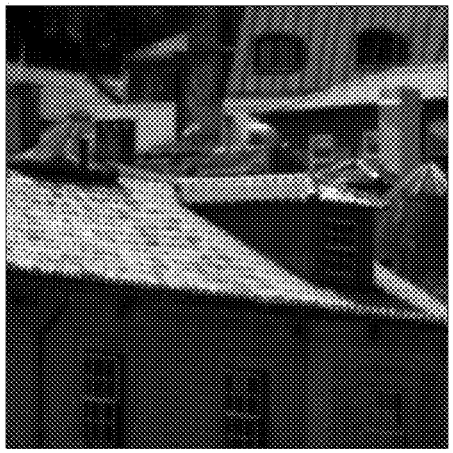
Figure 7D:
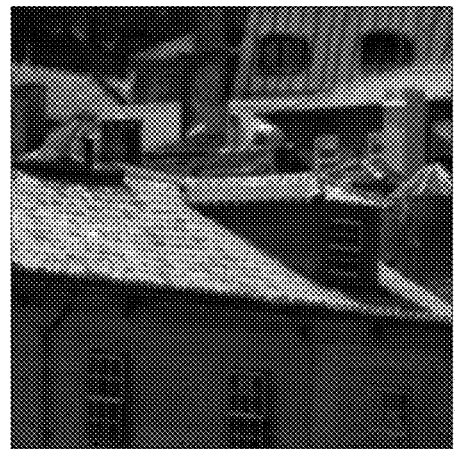
Figure 7E:
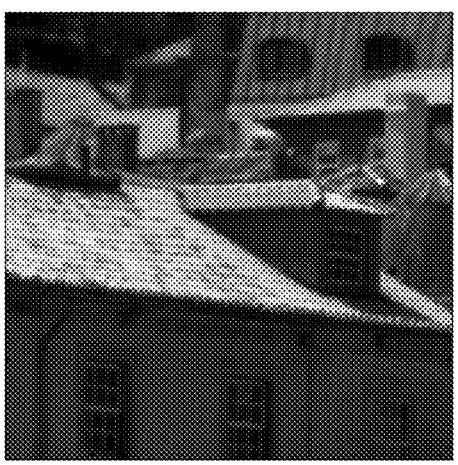
Figure 7E:
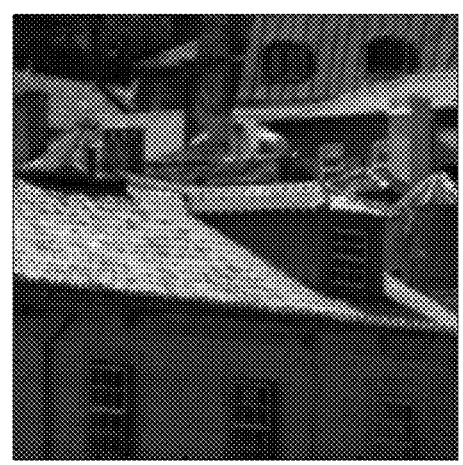
Figure 7F:
Figure 7F:
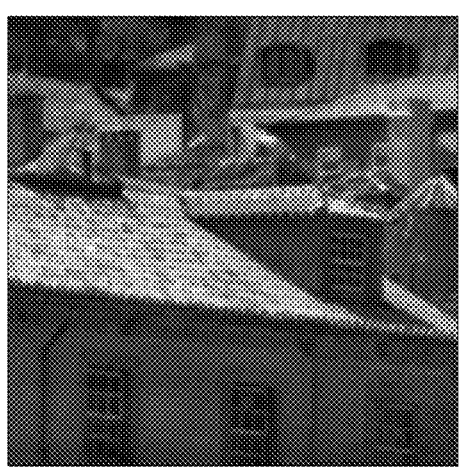
Figure 7G:
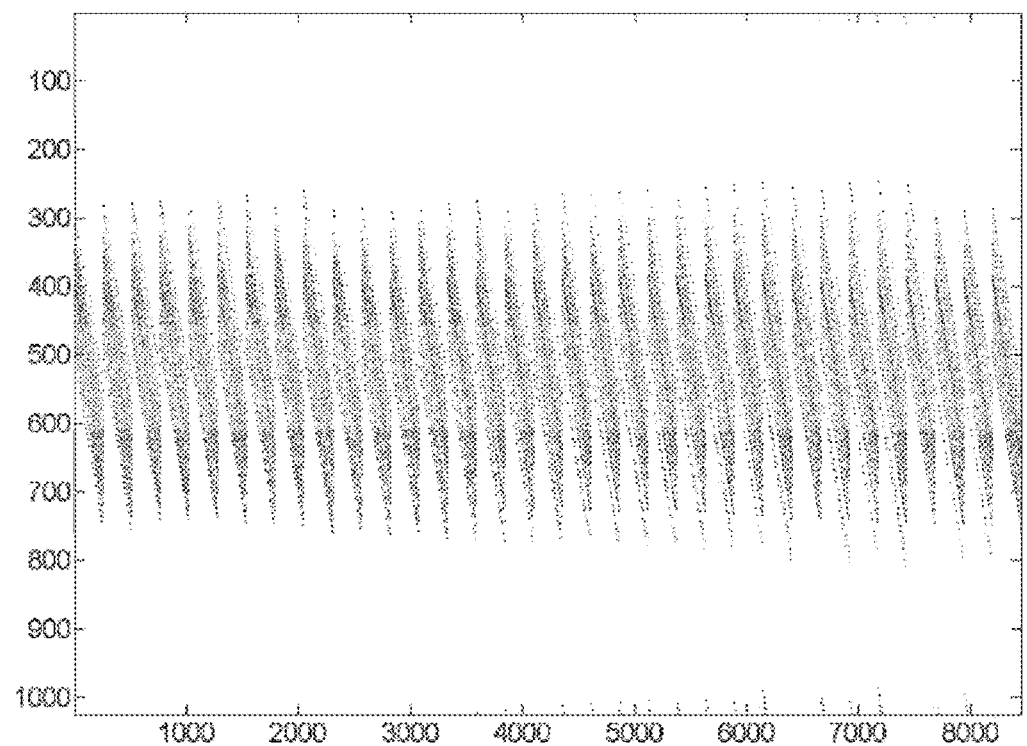
Figure 7H:
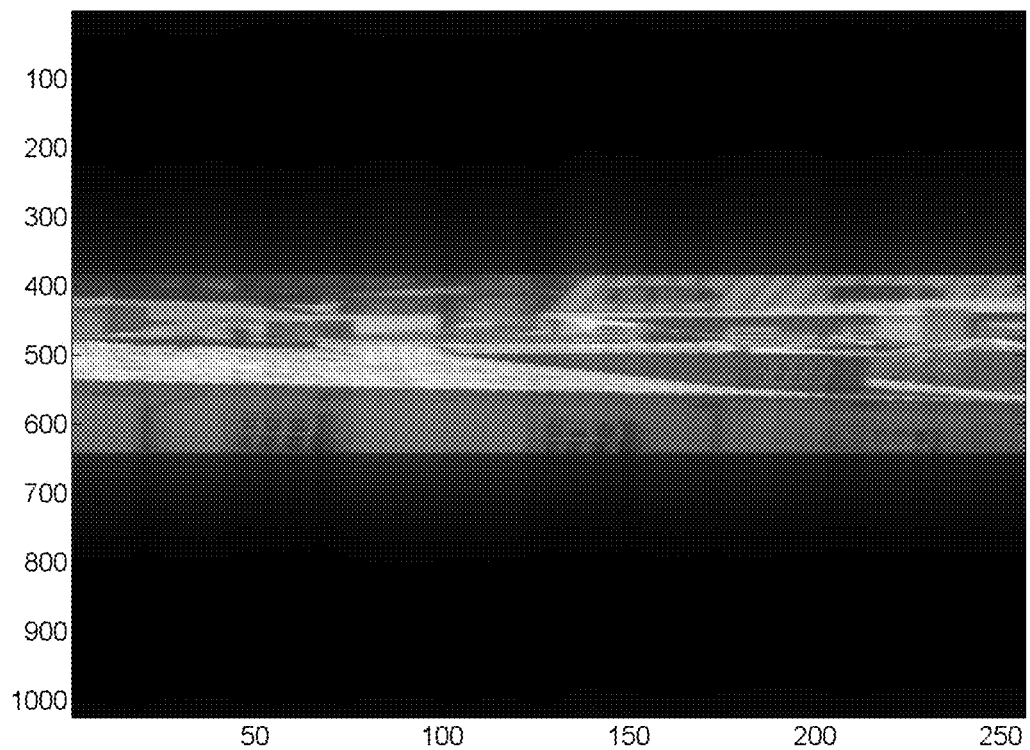

FIGS. 7A-J show simulation results for 2D CS-SCR from a snapshot image obtained with a digital camera equipped with a 1D RIP diffuser (FIG. 3), i.e. in an embodiment "without randomizer". The source of spectral data cube was a fragment (gray-level version is in FIG. 7I, left) of a multispectral houses in Porto scene with L=33 wavelength bands. Six out of 33 monochromatic images extracted from the source spectral cube are shown on the left in FIGS. 7A-F. Their spectral bands are wavelengths numbered l=12, 17, 19, 26, 28 and 33. FIG. 7G shows a graphical representation of sensing matrix A, which consists of 33 blocks that match the wavelengths. A respective DD image received on the image sensor is shown in FIG. 7H. FIGS. 7A-F show on the right reconstructed images at 6 sampled wavebands and on the left, for comparison, respective original images. The computer simulation results provided the following PSNR ratios: FIG. 7A, l=12, PSNR=26.08 dB; FIG. 7B, l=17, PSNR=27.81 dB; FIG. 7C, l=19, calculated PSNR=29.03 dB; FIG. 7D, l=26, calculated PSNR=28.87 dB; FIG. 7E, l=28, calculated PSNR=30.3 dB; FIG. 7F, l=33, PSNR=26.46 dB.

Figure 7I:
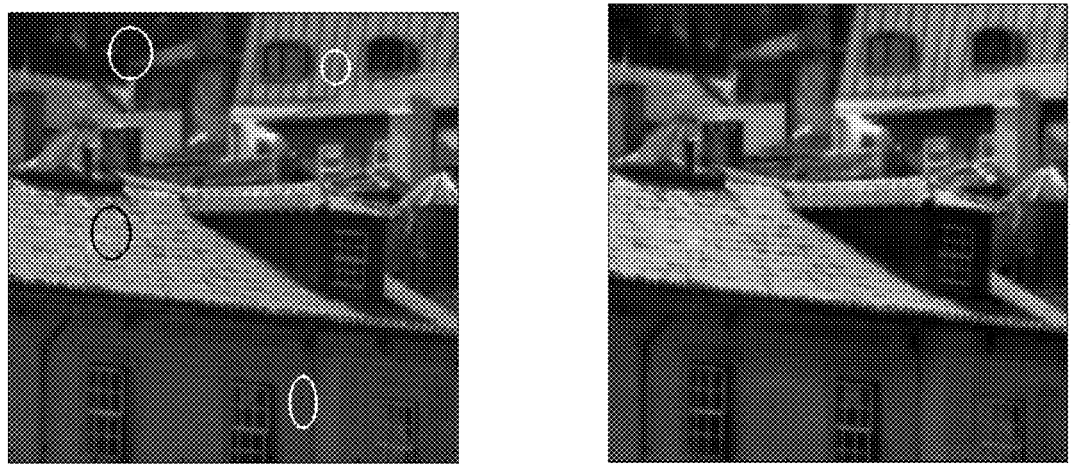
Figure 7J:
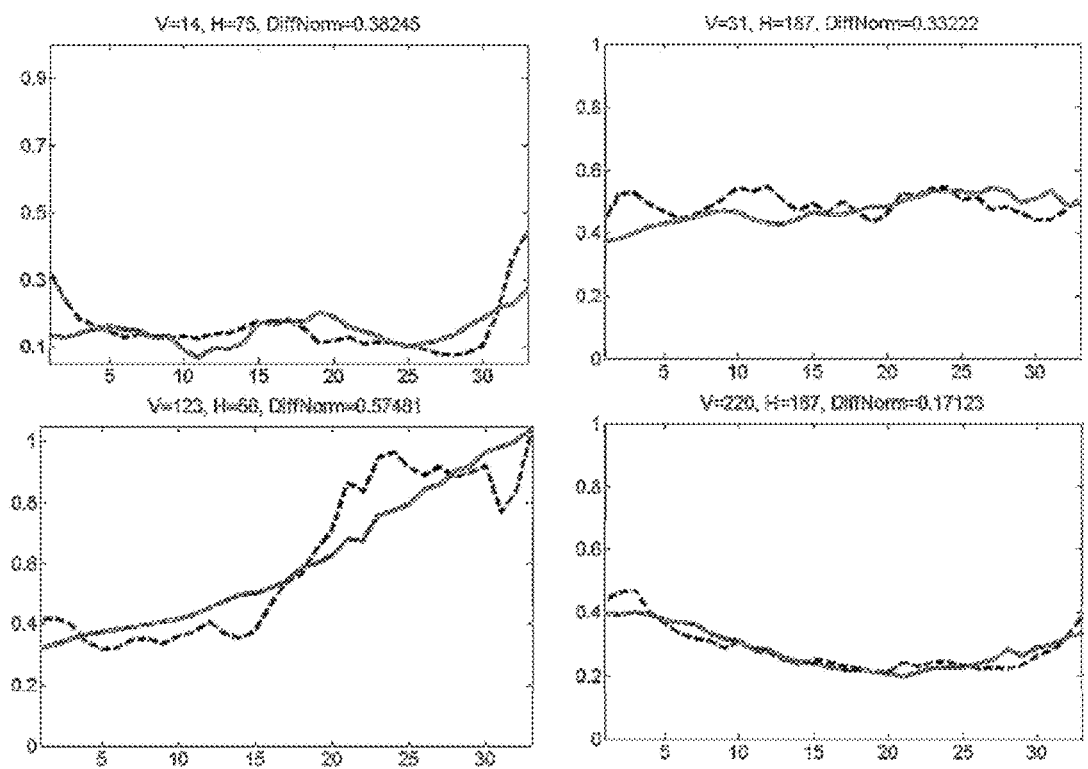

FIG. 7I shows grayscale images compiled from 33 original source images (left) vs. the image compiled from 33 restored waveband images (right). Four sampling points are shown in ovals on the left. Full spectra at the sampling points are shown in FIG. 7J. In particular, the comparison between the original (dashed lines) and reconstructed (solid lines) spectra for 33 spectral bands at the four sampling points shows a high quality reconstruction.

Figure 8A:
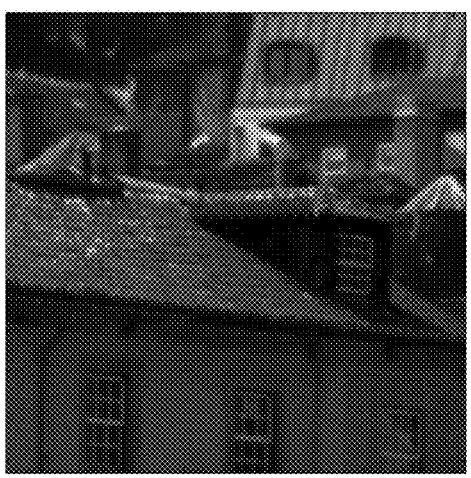
FIGS. 8A-J show results of a simulation of 2D CC-SCR on a snapshot image obtained with a digital camera equipped with a 1D RIP diffuser and software randomizer.
Figure 8A:
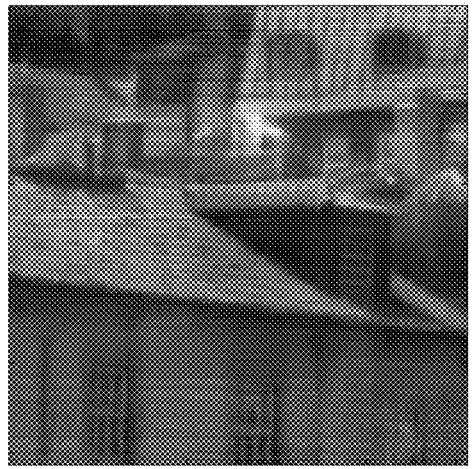
Figure 8B:
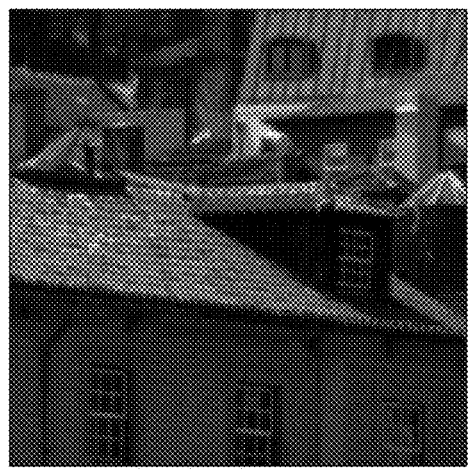
Figure 8B:
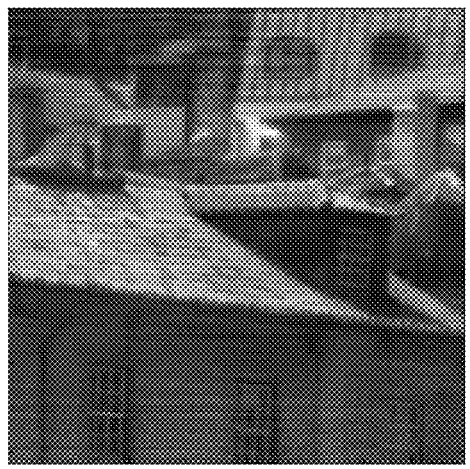
Figure 8C:
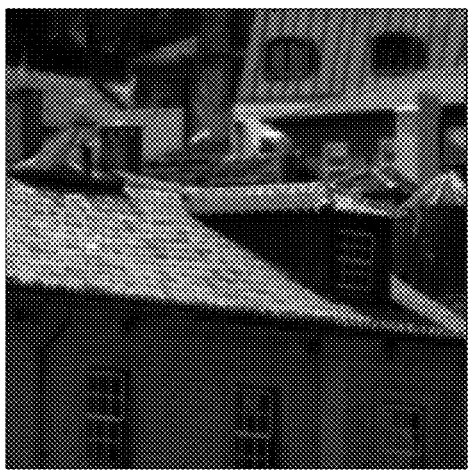
Figure 8C:
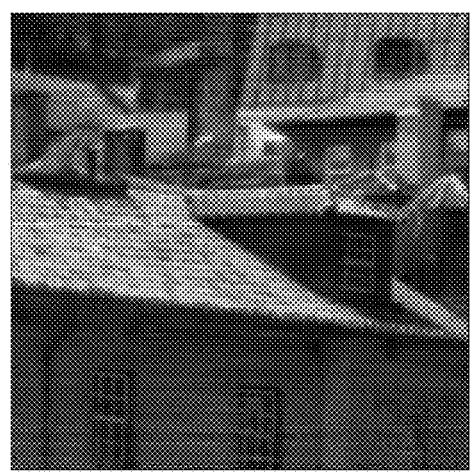
Figure 8D:
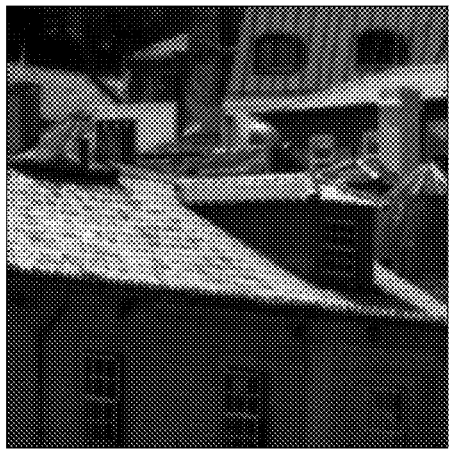
Figure 8D:
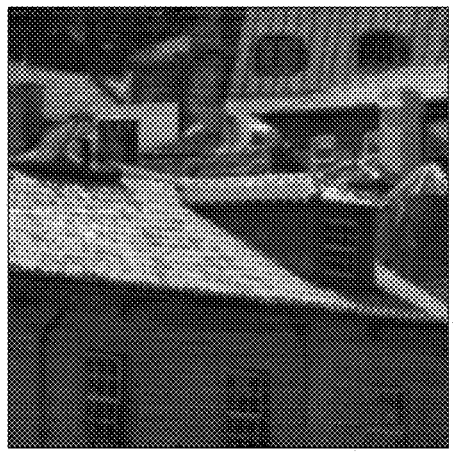
Figure 8E:
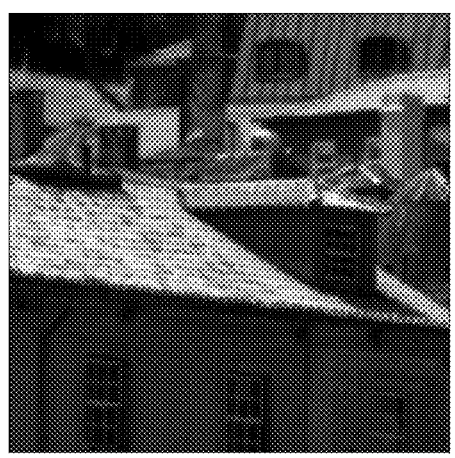
Figure 8E:
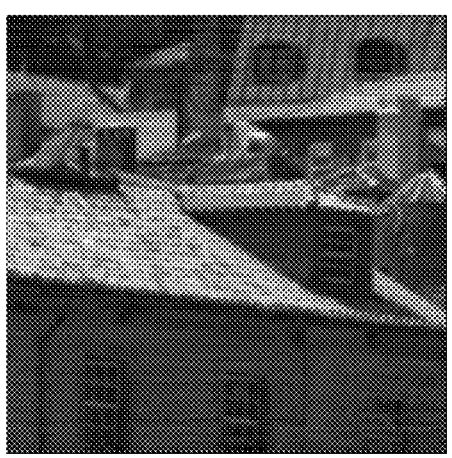
Figure 8F:
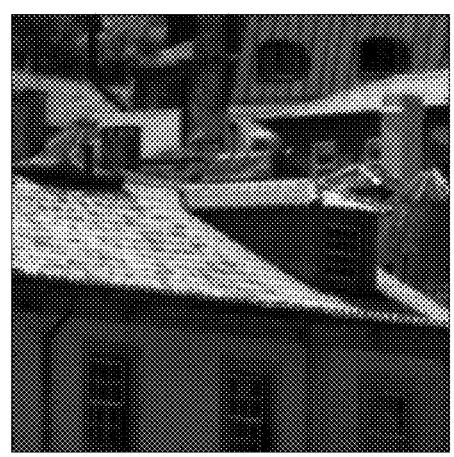
Figure 8F:
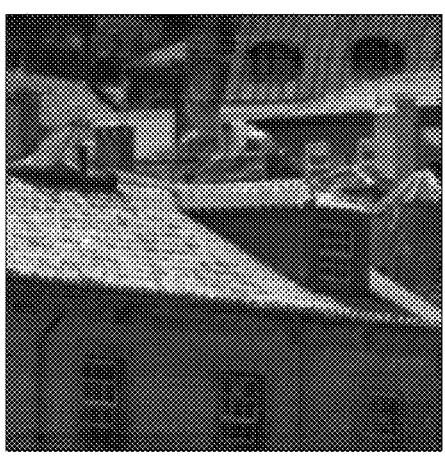
Figure 8G:
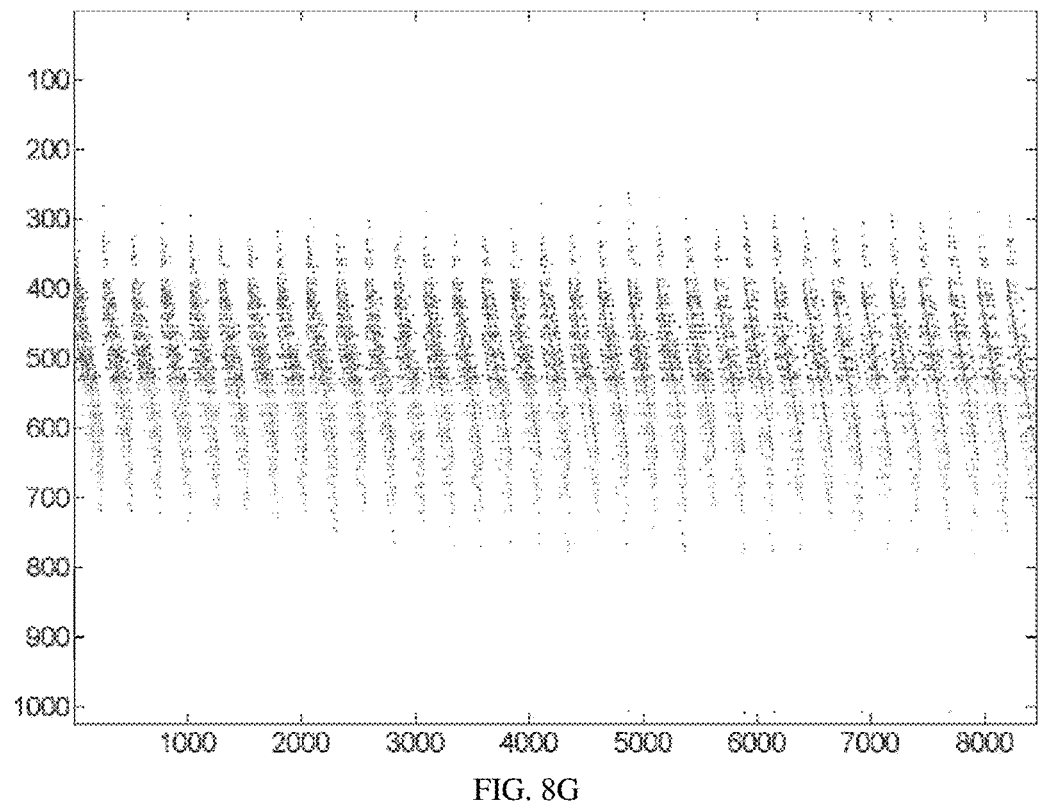
Figure 8H:
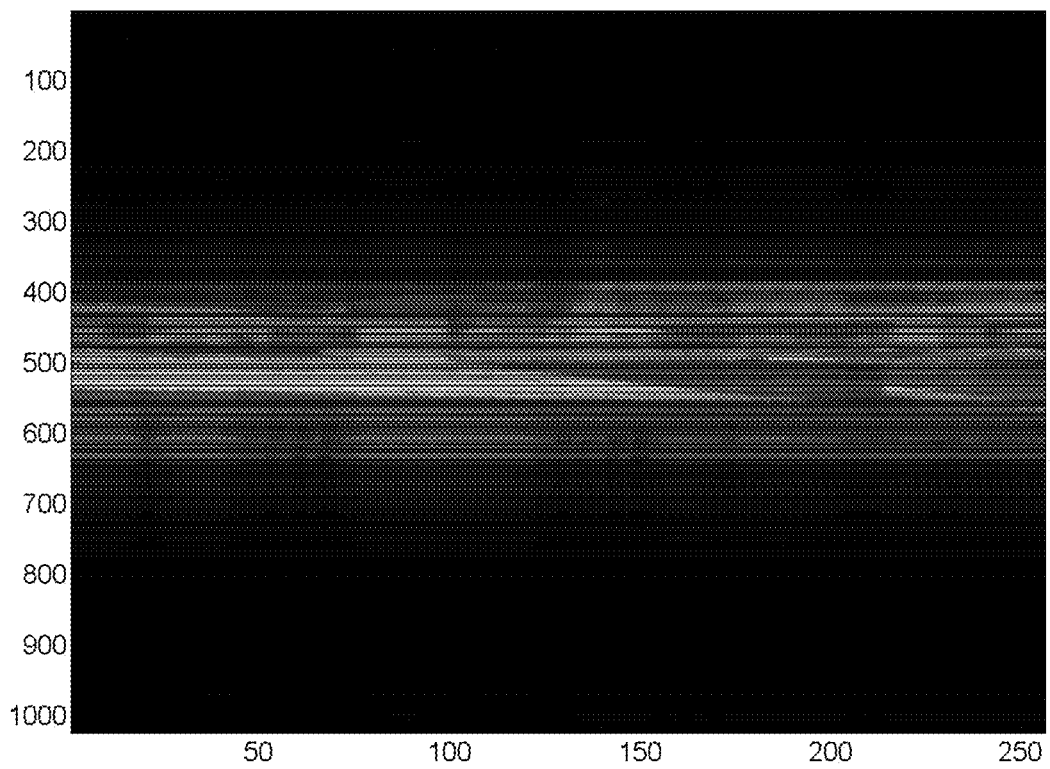

FIGS. 8A-8J show simulation results for 2D CC-SCR from a snapshot image obtained with a digital camera equipped with a 1D RIP diffuser (FIG. 3) and a SW randomizer, i.e. in an embodiment "with randomizer". The spectral data cube source was the same as in FIGS. 7A-7J. Six out of 33 monochromatic images extracted from the entire source spectral cube are shown on the left in FIGS. 8A-F. Their spectral bands are wavelengths numbered l=12, 17, 19, 26, 28 and 33. A fragment of the randomizer was already shown in FIG. 4. In the simulations, matrix A was modified to consider the randomizer, as described above. FIG. 8G shows a graphical representation of a randomized sensing matrix A, which consists of 33 blocks that match the wavelengths. From this point, all the calculations were done in the similar manner to the "without randomizer" embodiment of FIGS. 7A-7J. The combined use of RIP diffuser and randomizer provided a randomized image at the camera sensor. Such an image is shown in FIG. 8H. FIGS. 8A-F show on the right reconstructed images at 6 sampled bands and on the left, for comparison, respective original images. The results of the computer simulations without randomizer provided the following calculated PSNR ratios: FIG. 8A, l=12, PSNR=25.5; FIG. 8B, l=17, PSNR=26.71; FIG. 8C, l=19, PSNR=27.44; FIG. 8D, l=26, PSNR=27.31; FIG. 8E, l=28, PSNR=28.74; FIG. 8F, l=33, PSNR=25.8.

Figure 8I:
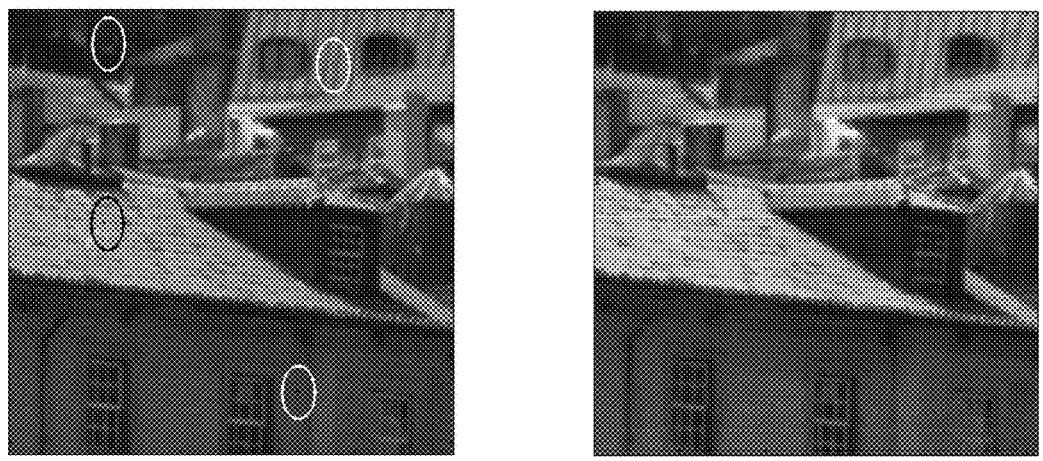
Figure 8J:
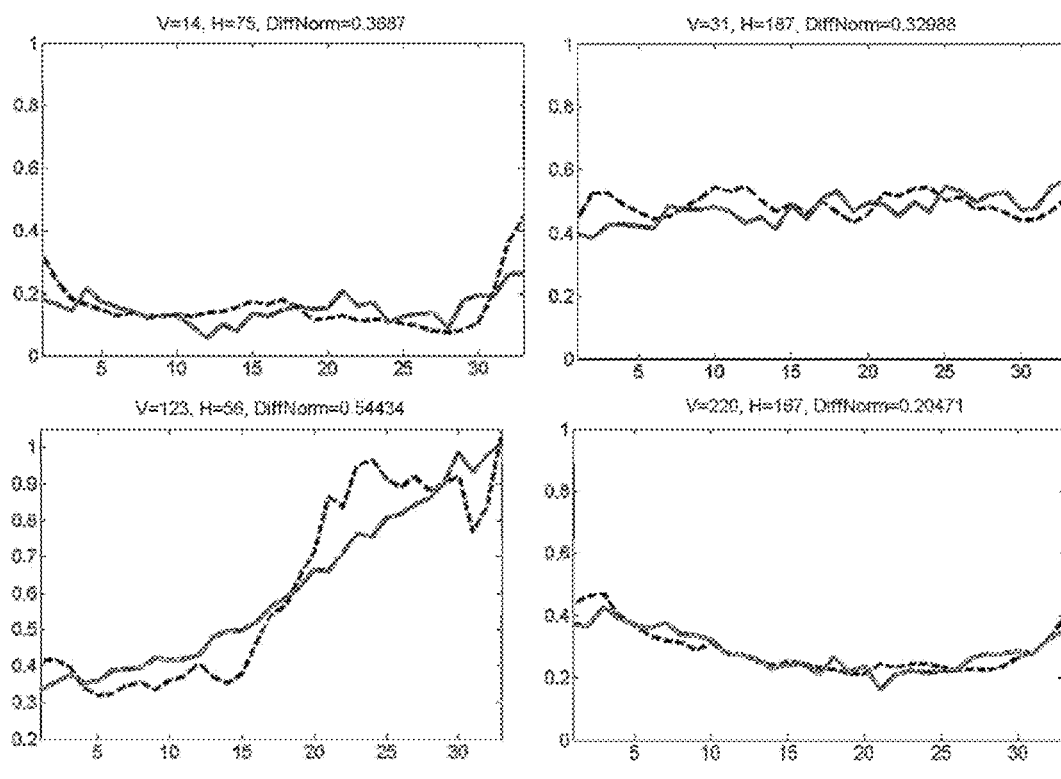

FIG. 8I shows grayscale images compiled from 33 original source images (left) vs. the image compiled from 33 restored waveband images (right) with randomizer Four sampling points are shown in ovals on the left. Full spectra at the sampling points are shown in FIG. 8J. In particular, the comparison between the original (dashed lines) and reconstructed (solid lines) spectra for 33 spectral bands at the four sampling points shows a high quality reconstruction with randomizer Even though the randomizer may slightly reduce the PSNR in computer simulations, it provides additional randomness for the sensing matrix. The additional randomness may contribute to satisfy the RIP condition and improve the SCR in some optical systems.

Added Apparatus Embodiments

Figure 9A:
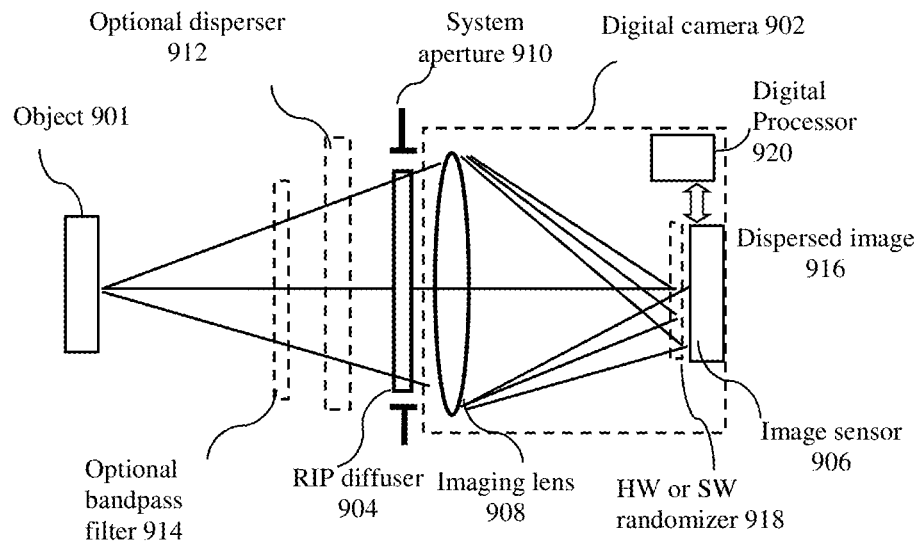
FIG. 9A shows schematically another embodiment of a SSI apparatus disclosed herein.
Figure 9B:
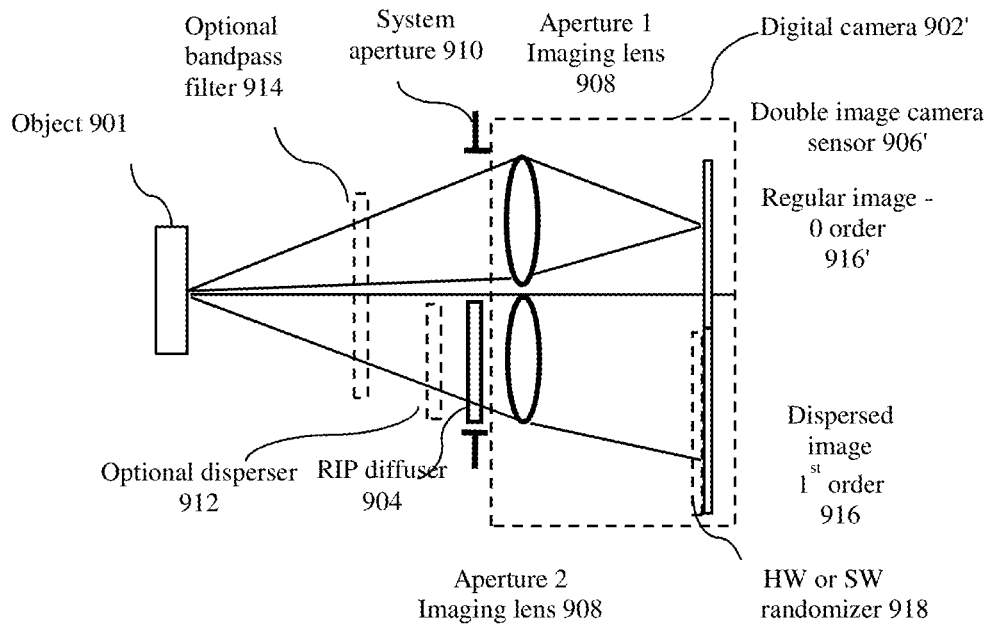
FIG. 9B shows schematically yet another embodiment of a SSI apparatus disclosed herein.

FIG. 9A shows schematically an embodiment 900 of a SSI apparatus disclosed herein. Apparatus 900 includes a digital camera 902, a RIP diffuser 904, an image sensor 906, an imaging lens 908, a system aperture 910 and a randomizer 918. Optionally, it may include a 1D (or 2D) disperser 912 and a band-pass spectral filter 914. Image sensor 906 provides a DD image 916. The RIP diffuser, (and optionally the disperser), may be positioned at the plane of the system aperture diaphragm, allowing the diffuser to function in an essentially plane light-wave mode, which minimizes inherent aberrations and improves image quality. In an embodiment, the RIP diffuser may be part of a lens block and placed inside the camera. In another embodiment, the RIP diffuser may be placed outside the digital camera, between the camera lens and the object. In yet another embodiment, the RIP diffuser may be placed inside the digital camera lens, between the lens and the image sensor. Randomizer 918 may be a HW or SW randomizer. The design of the component lenses may be matched with the light dispersing properties of the diffuser (and, if present, of the disperser). The processing of the DD image and other information is performed by a digital processor 920, which may be integrated in the digital camera or may be external to the camera. Such a processor exists in all apparatus embodiments FIGS. 9B-13, but is not shown for simplicity. Since miniaturized digital cameras are known and since the RIP diffuser may be made in the form of a thin diffusive-diffractive optical element, an apparatus such as apparatus 900 can clearly be miniaturized, for example for use in a smart-phone or in a diagnostic pill.

FIG. 9B shows schematically another embodiment 900' of a SSI apparatus disclosed herein. Similar to apparatus 900, apparatus 900' includes a digital camera 902', a RIP diffuser 90, and a randomizer 918, except that camera 902' is a double-aperture camera that includes two apertures for imaging lenses 908 instead of single system aperture 910.

Accordingly, image sensor 906 is replaced by a double-image sensor 906', which captures both a regular image 916' and a DD image 916. In other embodiments, there may be more than two apertures. In general, an apparatus disclosed herein may also use designs with two optical paths leading to a single image sensor, see e.g. US patent application No. 2007/0285554. One path may pass through a RIP diffuser to produce a DD image, while the other passes directly to the image sensor to provide a regular image.

FIGS. 10-13 show other embodiments of SSI apparatus disclosed herein that include two-channels of imaging: one with a RIP diffuser and one with regular imaging as in a digital camera. All following embodiments provide both a DD image and a regular image. The DD image may be converted into a randomized image by the action of a randomizer 918. The two images are subtracted, when necessary, for implementation of a negative-valued sensing matrix in incoherent optical imaging systems.

Figure 10:
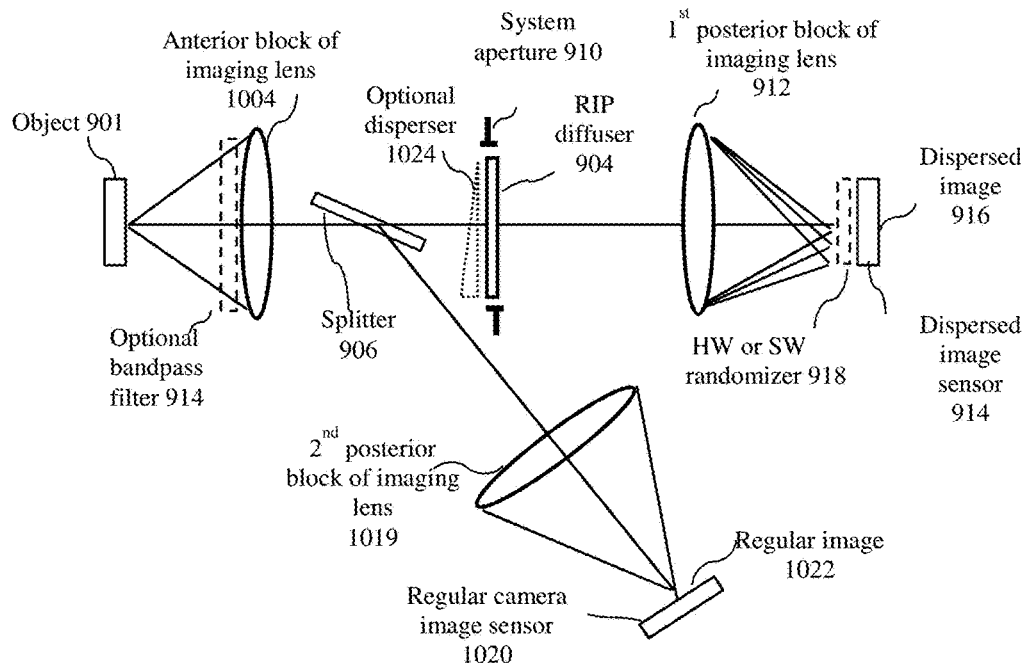
FIG. 10 shows schematically yet another embodiment of a SSI apparatus disclosed herein.

FIG. 10 shows schematically an embodiment 1000 of a SSI apparatus disclosed herein. This embodiment includes a reflective-refractive beam splitter and two separate image sensors. Apparatus 1000 includes in addition to elements mentioned above an anterior block of imaging lens 1004, a beam splitter 1006, a system aperture diaphragm 1010, a 1$^{st}$ posterior block of imaging lens 1012, a 2$^{nd}$ posterior block of imaging lens 1019, and a regular image sensor 1020 for providing a regular image 1022. Optionally, apparatus 1000 may include a 1D (or 2D) disperser 1024. Splitter 1006 may be a semi-transparent mirror or beam splitting cube, oriented at an angle larger than 45 degrees to the optical axis, such as to reflect light to lens 1019. The RIP diffuser (and, optionally, the disperser) are placed preferably at the plane of system aperture 1010.

Figure 11:
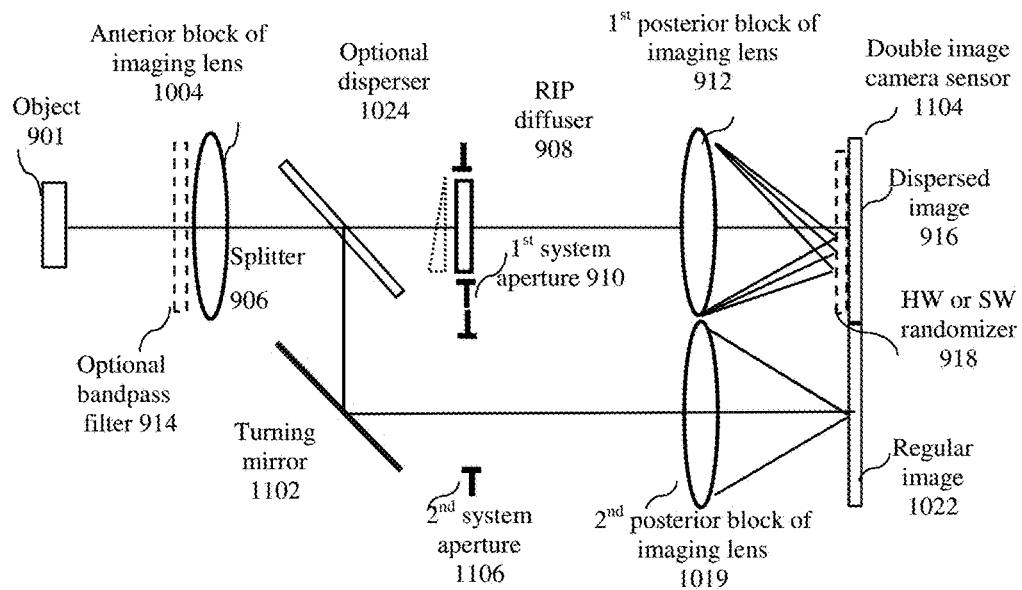
FIG. 11 shows schematically yet another embodiment of a SSI apparatus disclosed herein.

FIG. 11 shows schematically yet another embodiment 1100 of a SSI apparatus disclosed herein. Like apparatus 1000, apparatus 1100 includes a randomizer installed in front of a part of the double image sensor 1004 that captures only DD image 916. In contrast with apparatus 1000, apparatus 1100 includes an added turning mirror 1102, a double image sensor 1104 that captures both dispersed-diffused and regular images, and a second system aperture 1106. Here, splitter 1006 is oriented at an angle close to 45 degrees to the optical axis, such as to reflect light to turning mirror 1102. The double-image sensor is obtained by aligning the dispersed-diffused and regular image sensors.

Figure 12:
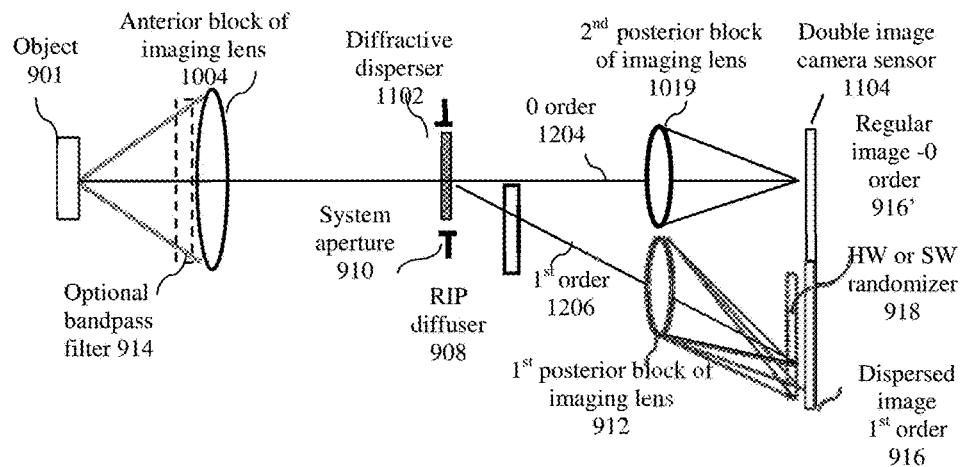
FIG. 12 shows schematically yet another embodiment of a SSI apparatus disclosed herein.

FIG. 12 shows schematically yet another embodiment 1200 of a SSI apparatus disclosed herein. In contrast with apparatus 1000 and 1100, apparatus 1200 includes a diffractive disperser 1202 that serves as both beam splitter and 1D disperser. Also included is a double image sensor as in FIG. 11. Diffractive disperser 1202 may be implemented as a diffraction grating that splits light to 0 and 1$^{st}$ diffraction orders 1204 and 1206, where the 0 order has no dispersion and forms a regular image 1208 and where the 1$^{st}$ order has dispersion and forms a DD image 1210 on the double image sensor. The randomizer is preferably installed in front of a part of the double image sensor that captures only the DD image.

Figure 13:
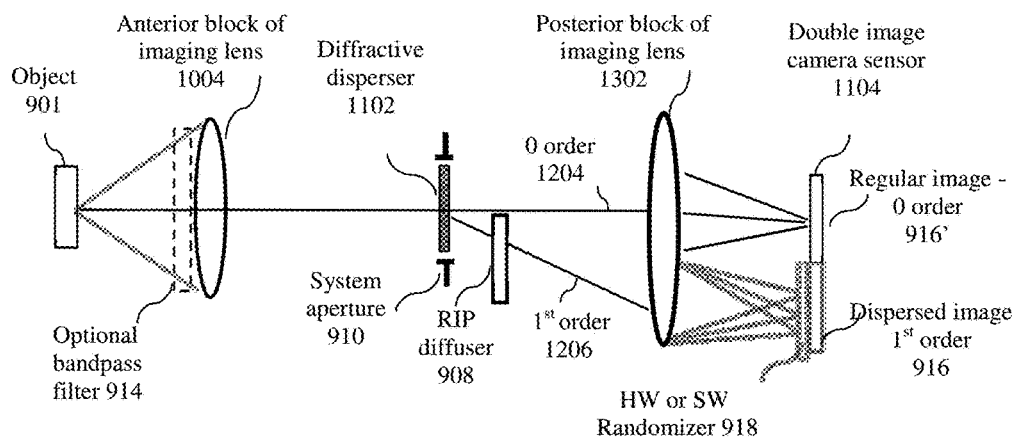
FIG. 13 shows schematically yet another embodiment of a SSI apparatus disclosed herein.

FIG. 13 shows schematically yet another embodiment 1300 of a SSI apparatus disclosed herein. Apparatus 1300 includes a diffractive disperser as in FIG. 12, but has a single posterior block 1302 instead of two separate posterior blocks of imaging lenses. An anterior block 1304 and the system aperture diaphragm are packaged with posterior block 1302 to form the imaging lens. In some embodiments, either the anterior block or posterior block(s) of the imaging lens may be missing, such that the imaging lens is formed solely by the posterior block(s) or solely by the anterior block, respectively. The RIP diffuser and (if present) a disperser are preferably spatially located closer to the system aperture (or entrance or exit pupil of the imaging lens) than to the image sensor. The randomizer is preferably installed in front of a part of the double image sensor that captures only the DD image.

Each publication mentioned in this application is hereby incorporated by reference in its entirety for all purposes set forth herein. It is emphasized that citation or identification of any reference in this application shall not be construed as an admission that such a reference is available or admitted as prior art. While this disclosure describes a limited number of embodiments, it will be appreciated that many variations, modifications and other applications of such embodiments may be made. For example, while the description refers specifically to a DD image obtained through a particular RIP diffuser, the 2D CS-SCR methods described herein may be applied to any other dispersed-diffused image for which a sensing matrix A is defined. For example, while the description refers specifically to framelet transforms and Bregman iterations, other types of transforms or algorithms may be used for the SCR described herein. Further, while Toeplitz matrices and convolution are described in detail, more general matrices and linear transformations, corresponding to non-paraxial and spatially-variant optical systems and/or optical systems having aberrations may also be used. For example, while 1D diffusion/dispersion is described in detail, 2D diffusion/dispersion may also be used. Thus, the disclosure is to be understood as not limited to framelet transforms, split or other Bregman iterations and 1D diffusion/dispersion. In general, the disclosure is to be understood as not limited by the specific embodiments described herein, but only by the scope of the appended claims.

What is claimed is:

1. An apparatus for obtaining a plurality of spectral images of a source object in a snapshot, comprising:
   a) an imaging section of a digital camera that includes a lens and a pixelated image sensor, the imaging section configured to obtain a diffused and dispersed (DD) snapshot image Y; and
   b) a digital processor configured to perform two-dimensional compressed sensing spectral cube reconstruction (2D CS-SCR) from snapshot image Y by applying a 2D framelet transform separately to arrays representing different wavebands of spectral cube data derived from snapshot image Y, thereby providing images of the source object in a plurality of spectral bands.

2. The apparatus of claim 1, wherein the configuration to apply a 2D framelet transform separately to arrays representing different wavebands of spectral cube data includes a configuration to apply direct and inverse 2D framelet transforms to the arrays representing the different wavebands.

3. The apparatus of claim 2, wherein the direct and inverse framelet transforms are included in a split Bregman iteration.

4. The apparatus of claim 1, wherein further comprising a restricted isometry property (RIP) diffuser inserted in an optical path between the source object and the image sensor, the RIP diffuser designed to satisfy a RIP condition related to a sensing matrix A, wherein the processor configuration includes a configuration to transpose matrix A to a transposed matrix $A^T$, to apply $A^T$ to Y to obtain a matrix $A^T Y$, to apply a 2D direct sparsifying transform D to matrix $A^T Y$ to obtain a sparse version d of a reconstructed data cube X, to use an inverse transform Ψ to obtain X from d, and to process X to obtain the images of the source object in the plurality of spectral bands.

5. The apparatus of claim 4, wherein the RIP diffuser is the form of a random phase mask implemented as a 1D grid of random groove depth steps.

6. The apparatus of claim 5, wherein the grid of random groove steps includes a randomized saw-tooth structure.

7. The apparatus of claim 1, wherein the processor is included in the digital camera.

8. The apparatus of claim 1, further comprising a randomizer configured to randomize snapshot image Y to obtain a randomized image, wherein the processor is further configured to perform the 2D CS-SCR from the randomized image.

9. The apparatus of claim 8, wherein the randomizer is implemented as a thin optical element positioned adjacent to, or at an image sensor plane.

10. The apparatus of claim 9, wherein the randomizer element includes a pixelated structure identical with the image sensor pixelated structure.

11. The apparatus of claim 10, wherein the randomizer pixelated structure includes a random structure of pixels varying in transparency from 0 to 100%.

12. The apparatus of claim 8, wherein the randomizer is implemented as a software module in the processor.

13. A method for obtaining a plurality of spectral images of a source object in a snapshot, comprising the steps of:
 a) obtaining a diffused and dispersed (DD) snapshot image Y; and
 b) performing a two-dimensional compressed sensing data cube reconstruction (2D CS-SCR) from snapshot image Y, wherein the step of performing a 2D CS-SCR from snapshot image Y includes applying a 2D framelet transform separately to arrays representing different wavebands of a spectral cube data derived from snapshot image Y, thereby providing images of the source object in a plurality of spectral bands.

14. The method of claim 13, wherein the step of obtaining the DD snapshot image Y includes imaging the source object with an imaging section of a digital camera that includes a lens and a pixelated image sensor.

15. The method of claim 14, wherein the step of imaging further includes imaging the source object through a restricted isometry property (RIP) diffuser inserted in an optical path between the source object and the image sensor, wherein the RIP diffuser satisfies a RIP condition related to a sensing matrix A.

16. The method of claim 15, wherein the step of performing a 2D CS-SCR from snapshot image Y includes:
 i. transposing sensing matrix A into a transposed matrix $A^T$,
 ii. applying $A^T$ to snapshot image Y to obtain a matrix $A^T Y$,
 ii applying a 2D direct sparsifying transform D to matrix $A^T Y$ to obtain a sparse version d of a reconstructed data cube X,
 iv. using an inverse transform Ψ to obtain X from d, and
 v. processing X by a split Bregman iteration to obtain the images of the source object in the plurality of spectral bands.

17. The method of claim 13, wherein the applying a 2D framelet transform separately to arrays representing different wavebands of spectral cube data includes applying direct and inverse 2D framelet transforms to arrays representing the different wavebands.

18. The method of claim 17, wherein the direct and inverse framelet transforms are included in a split Bregman iteration.

19. The method of claim 13, further comprising the step of randomizing the DD image to obtain a randomized image, wherein the step of performing a 2D CS-SCR includes performing the 2D CS-SCR from the randomized image.

20. The method of claim 19, wherein the step of randomizing includes using a thin optical randomizer element inserted between the RIP diffuser and the image sensor.

21. The method of claim 19, wherein the step of performing the 2D CS-SCR from the randomized image includes applying a 2D framelet transform separately to arrays representing different wavebands of a spectral cube data derived from the randomized image.

22. The method of claim 19, wherein the step of randomizing includes randomizing using a software-implemented randomizer.

* * * * *